United States Patent
Sun et al.

(10) Patent No.: US 11,104,003 B2
(45) Date of Patent: Aug. 31, 2021

(54) METHOD AND DEVICE FOR MOVING AN ARTICLE BASED ON DENSE STORAGE, STORAGE MEDIUM, AND DENSE STORAGE SYSTEM

(71) Applicant: BEIJING GEEKPLUS TECHNOLOGY CO., LTD., Beijing (CN)

(72) Inventors: Kai Sun, Beijing (CN); Lei Wang, Beijing (CN); Ka Ho Fung, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/926,457

(22) Filed: Jul. 10, 2020

(65) Prior Publication Data

US 2020/0377299 A1 Dec. 3, 2020

Related U.S. Application Data

(63) Continuation-in-part of application No. PCT/CN2019/099860, filed on Aug. 8, 2019.

(30) Foreign Application Priority Data

Aug. 10, 2018 (CN) .......................... 201810911672.6
Oct. 17, 2018 (CN) .......................... 201811208950.8

(51) Int. Cl.
*B25J 9/16* (2006.01)
*B65G 1/04* (2006.01)
(Continued)

(52) U.S. Cl.
CPC ............. *B25J 9/1679* (2013.01); *B25J 5/007* (2013.01); *B25J 9/161* (2013.01); *B25J 9/1664* (2013.01);
(Continued)

(58) Field of Classification Search
CPC ............................. B65G 1/0492; B25J 9/1679
See application file for complete search history.

(56) References Cited

U.S. PATENT DOCUMENTS 5,427,444 A * 6/1995 Griesemer ............... G01V 8/12
312/201
9,111,251 B1 * 8/2015 Brazeau ............... G06Q 10/087
(Continued)

FOREIGN PATENT DOCUMENTS

CN 102096865 A 6/2011
CN 102602643 A * 7/2012 ............... B65G 1/12
(Continued)

OTHER PUBLICATIONS

International Search Report for PCT/CN2019/099860 dated Oct. 31, 2019 in English Translation.
(Continued)

*Primary Examiner* — Thomas Randazzo
(74) *Attorney, Agent, or Firm* — Arent Fox LLP

(57) ABSTRACT

Disclosed are a method and device for moving an article based on dense storage, a storage medium, and a dense storage system. The method includes: upon detecting that a target shelf is blocked by at least one blocking shelf, instructing a first self-driven robot to remove the blocking shelf and/or a blocking storage box to make the target shelf not blocked by the blocking shelf or make a target storage box on the target self not blocked by the blocking storage box; instructing the first self-driven robot to carry the blocking shelf and/or the blocking storage box and perform a circular movement along a robot travelling passage; and instructing a second self-driven robot to move the target shelf from its current position to a workstation, or instructing
(Continued)

the second self-driven robot to remove the target storage box from the target shelf and move the target storage box to the workstation.

21 Claims, 16 Drawing Sheets

(51) Int. Cl.
*B25J 5/00* (2006.01)
*B65G 1/06* (2006.01)
*B65G 1/10* (2006.01)
*B65G 1/12* (2006.01)
*B65G 1/137* (2006.01)

(52) U.S. Cl.
CPC .......... *B65G 1/0492* (2013.01); *B65G 1/065* (2013.01); *B65G 1/10* (2013.01); *B65G 1/12* (2013.01); *B65G 1/137* (2013.01); *B65G 2201/025* (2013.01); *Y10S 901/01* (2013.01)

(56) References Cited

U.S. PATENT DOCUMENTS

| | | | | |
|---|---|---|---|---|
| 9,378,484 B1* | 6/2016 | Russell | ............ | G06K 7/10099 |
| 9,452,883 B1* | 9/2016 | Wurman | ............ | G05D 1/0287 |
| 9,572,426 B1* | 2/2017 | Nauseda | ............ | B65G 1/02 |
| 9,682,822 B2* | 6/2017 | Lindbo | ............ | G05B 15/02 |
| 10,035,651 B2* | 7/2018 | Lindbo | ............ | B65G 1/137 |
| 10,133,276 B1* | 11/2018 | Shydo, Jr. | ............ | G05D 1/0214 |
| 2014/0100769 A1* | 4/2014 | Wurman | ............ | B65G 1/10 701/301 |
| 2015/0127143 A1* | 5/2015 | Lindbo | ............ | B65G 1/137 700/218 |
| 2016/0145045 A1* | 5/2016 | Mountz | ............ | B65G 1/137 700/216 |
| 2016/0229631 A1* | 8/2016 | Kimura | ............ | B65G 1/10 |
| 2018/0029798 A1* | 2/2018 | Lindbo | ............ | B65G 1/0464 |
| 2018/0113475 A1* | 4/2018 | Brazeau | ............ | G05D 1/0276 |
| 2018/0213160 A1* | 7/2018 | Tomiyama | ............ | B25J 5/007 |
| 2018/0244467 A1* | 8/2018 | Hognaland | ............ | B65G 1/0464 |

FOREIGN PATENT DOCUMENTS

| | | |
|---|---|---|
| CN | 103723422 A | 4/2014 |
| CN | 104828450 A | 8/2015 |
| CN | 105992745 A | 10/2016 |
| CN | 106064717 A | 11/2016 |
| CN | 106347919 A | 1/2017 |
| CN | 106379684 A | 2/2017 |
| CN | 106395218 A | 2/2017 |
| CN | 107256468 A | 10/2017 |
| CN | 207001433 U | 2/2018 |
| CN | 107922119 A | 4/2018 |
| CN | 108137229 A | 6/2018 |
| CN | 108806115 A | 11/2018 |
| CN | 109178743 A | 1/2019 |
| CN | 109279249 A | 1/2019 |
| CN | 110239873 A | 9/2019 |
| JP | 6220406 B2 | 10/2017 |
| JP | 2018043832 A | 3/2018 |
| JP | 2018528134 A | 9/2018 |
| WO | 2013167907 A1 | 11/2013 |
| WO | 2014011459 A1 | 1/2014 |
| WO | 2017/037095 A1 | 3/2017 |
| WO | 2015097736 A1 | 3/2017 |

OTHER PUBLICATIONS

First Office Action corresponding to Chinese Application No. 201811208950.8 dated Sep. 4, 2019.
Second Office Action corresponding to Chinese Application No. 201811208950.8 dated Mar. 4, 2020.
First Office Action received to corresponding Japanese Patent Application No. 2020-521352 dated Sep. 1, 2020.

* cited by examiner

METHOD AND DEVICE FOR MOVING AN ARTICLE BASED ON DENSE STORAGE, STORAGE MEDIUM, AND DENSE STORAGE SYSTEM

CROSS-REFERENCE TO RELATED APPLICATIONS

The present application is a continuation-in-part of International Patent Application Number PCT/CN2019/099860, filed on Aug. 8, 2019, which claims the priority of Chinese patent application No. 201810911672.6 filed with the China National Intellectual Property Administration (CNIPA) on Aug. 10, 2018, and Chinese patent application No. 201811208950.8 filed with the CNIPA on Oct. 17, 2018, contents of all of which are incorporated herein by reference in their entireties.

TECHNICAL FIELD

Embodiments of the present application relate to the field of warehousing technology and robot control technology, and for example, relate to a method and device for moving an article based on dense storage, a storage medium, and a dense storage system.

BACKGROUND

With the continuous development of the warehousing industry, more and more self-driven robots are used in the warehousing industry. The user may use storage container in the warehouse for purposes of storing articles. When the user needs a certain article, the self-driven robot can move the storage container to the user's location so that the user can take the item from the storage container. However, when the warehouse where articles are stored has a relatively small space, especially in order to save space cost brought about by the size of the warehouse space, a "mini-warehouse" may be used for storing articles. Because the storage containers in the "mini-warehouse" that are used for storing articles are densely placed, the travelling passage for the self-driven robot is restricted, such that the self-driven robot is not able to move freely to the location where the storage container is located to move the storage container like in a traditional large warehouse.

The warehouse management modes in the related art are far from meeting the actual needs of intelligence and density in terms of storage density and management efficiency. Therefore, no matter from the perspective of saving the warehouse space, or from the perspective of saving manpower for warehouse management, there is an urgent need for a solution whereby articles can be densely stored, the warehouse space can be greatly saved, and the manpower required for warehouse management can also be greatly saved.

SUMMARY

The following is a summary of the subject matter described in detail herein. This summary is not intended to limit the scope of protection conferred the claims.

Embodiments of the present application provide a method and apparatus for moving an article based on dense storage, an apparatus, a storage medium, and a dense storage system, thus realizing the purpose of moving stored articles in a dense storage context.

Embodiments of the present application provide a method for moving an article based on dense storage, including: upon detecting that a target shelf is blocked by at least one blocking shelf or a target storage box on the target shelf is blocked by at least one blocking storage box, instructing a first self-driven robot to remove the at least one blocking shelf and/or the at least one blocking storage box to make the target shelf not blocked by the at least one blocking shelf or make the target storage box on the target shelf not blocked by the at least one blocking storage box; and instructing a second self-driven robot to move the target shelf from current position to a workstation, or instructing the second self-driven robot to remove the target storage box from the target shelf and move the target storage box to the workstation.

Embodiments of the present application further provide a computer apparatus, which includes: at least one or more processors; a storage device configured to store at least one program, the at least one program, when executed by the at least one processor, causing the at least one processor to perform the method for moving an article based on dense storage as described in any of the above solutions.

Embodiments of the present application further provide a computer-readable storage medium storing a computer program, which, when executed by a processor, performs the method for moving an article based on dense storage as described in any of the above solutions.

Embodiments of the present application further provide dense storage system that includes: a first self-driven robot configured to remove a blocking shelf and/or a blocking storage box in accordance with an instruction of a control system; a second self-driven robot configured to carry a target shelf or a target storage box disposed on the target shelf in accordance with an instruction of the control system; a shelf area that includes a plurality of shelves configured for storing articles and being carried by self-driven robots, the plurality of shelves including the target shelf, which is surrounded by the blocking shelf on its periphery, and the self-driven robots comprising the first self-driven robot and the second self-driven robot; and a control system, configured to instruct the first self-driven robot to remove at least one blocking shelf and/or at least one blocking storage box to make the target shelf not blocked by the at least one blocking shelf or make the target storage box on the target shelf not blocked by the at least one blocking storage box, upon detecting that the target shelf is blocked by the at least one blocking shelf or the target storage box on the target shelf is blocked by the at least one blocking storage box, and instruct the second self-driven robot to move the target shelf from current position to a workstation or instruct the second self-driven robot to remove the target storage box from the target shelf and move the target storage box to the workstation.

Other aspects may be understood after reading and appreciating the accompanying drawings and detailed description.

BRIEF DESCRIPTION OF DRAWINGS

By reading the detailed description of the non-restrictive embodiments made with reference to the following drawings, it will be appreciated that these drawings are used for the mere purpose of illustrating some exemplary embodiments, and are not to be construed to be restricting the present application. In addition, like reference numerals are used to designate identical parts throughout the drawings.

DETAILED DESCRIPTION

Figure 1:
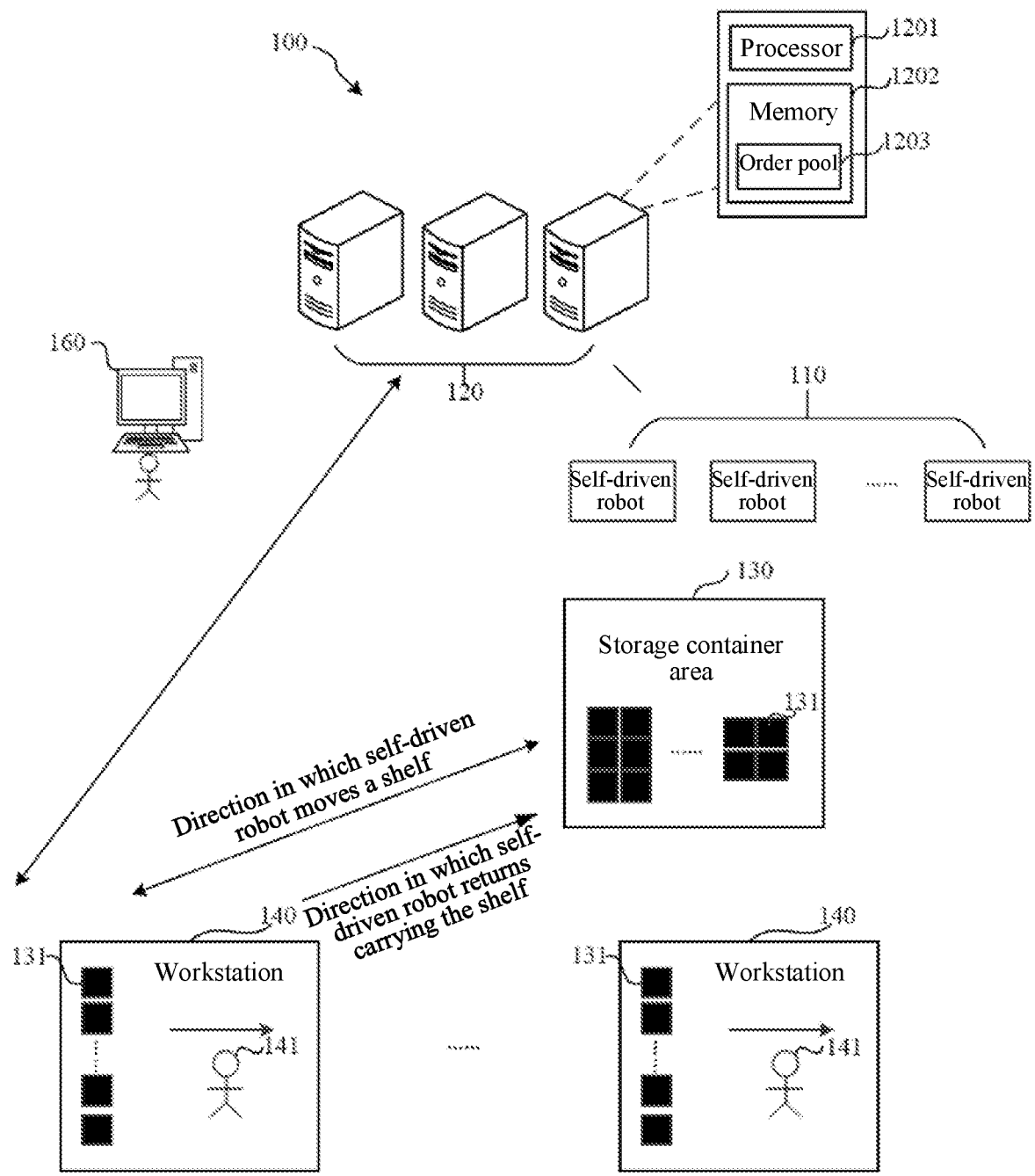
FIG. 1 is a schematic diagram illustrating a system structure of a warehousing system in accordance with an embodiment of the present application.

The present application will be described in detail below in connection with the accompanying drawings and embodiments. It is to be understood that the specific embodiments described herein are merely illustrative of the present application and are not intended to limit the present application. It should also be noted that, for ease of description, only some, rather than all, of the structures related to the present application are illustrated in the drawings.

FIG. 1 is a schematic diagram illustrating the system structure of a warehousing system in accordance with an embodiment of the present application. Referring to FIG. 1, the system 100 includes a self-driven robot 110, a control system 120, a storage container area 130 and a workstation 140. The storage container area 130 is provided with multiple storage containers 131, and various articles are placed on the storage container 131, the multiple storage containers 131 are arranged in an array. Generally, multiple workstations 140 are provided on a side of the storage container area 130. The storage container 131 may be any one of containers capable of storing articles, such as a shelf or a tray. Taking the shelf as an example, the shelf includes multiple compartments and four landing support columns, various articles may be directly placed on the compartment of the shelf, the compartment of the shelf may also be provided with multiple storage boxes, which may be separated from the shelf or may also be integrated with the shelf, and one or more articles may be placed in the storage box. In addition, the shelf may be a double-opening shelf, and two articles may be placed in a depth direction of an extension level, that is, one article may be placed in each opening direction; or two storage boxes may be provided in the depth direction of the extension level, that is, one storage box may be provided in each opening direction. The shelf may also be a single-opening shelf, and one article may be placed in the depth direction of the extension level, that is, only one article may be placed in the opening direction; or a storage box may be provided in the depth direction of the extension level, that is, only one storage box may be provided in the opening direction.

The control system 120 may be in wireless communication with the self-driven robot 110, and a worker (or an owner of the article) enables the control system 120 to operate through an operating platform 160. The self-driven robot 110 performs cargo transportation tasks under the control of the control system 120. For example, the self-driven robot 110 may travel along an empty space (a part of a passage for the self-driven robot 110) in the middle of a shelf array, move to the bottom of a target shelf 131, lift the target shelf 131 with a lifting mechanism, and carry the target shelf to the assigned workstation 140.

In one example, the self-driven robot 110 has a lifting mechanism, and is equipped with an autonomous navigation function. The self-driven robot 110 may travel to the bottom of the target shelf 131 and lift the entire shelf 131 with the lifting mechanism such that the shelf 131 may move up and down with the lifting mechanism having a lifting function. In one example, the self-driven robot 110 may travel according to two-dimensional code information captured by a camera, and may travel beneath the shelf 131 prompted by the control system 120 according to a route determined by the control system 120. The self-driven robot 110 carries the target shelf 131 to the workstation 140, and a worker (or an owner of the article) 141 at the workstation 140 may remove an article from the shelf 131. For the double-opening shelf, the shelf may be rotated by the self-driven robot 110 so that an opening direction of an article to be picked faces a person who picks the article, such as a worker or an owner of the article.

The control system 120 is a software system running on a server and having data storage and information processing capabilities, and may be connected wirelessly or wired to a robot, a hardware input system, and other software systems. The control system 120 may include one or more servers, and may be centralized control architecture or a distributed computing architecture. The server includes a processor 1201 and a memory 1202, where the memory 1202 may include an order pool 1203.

Figure 2:
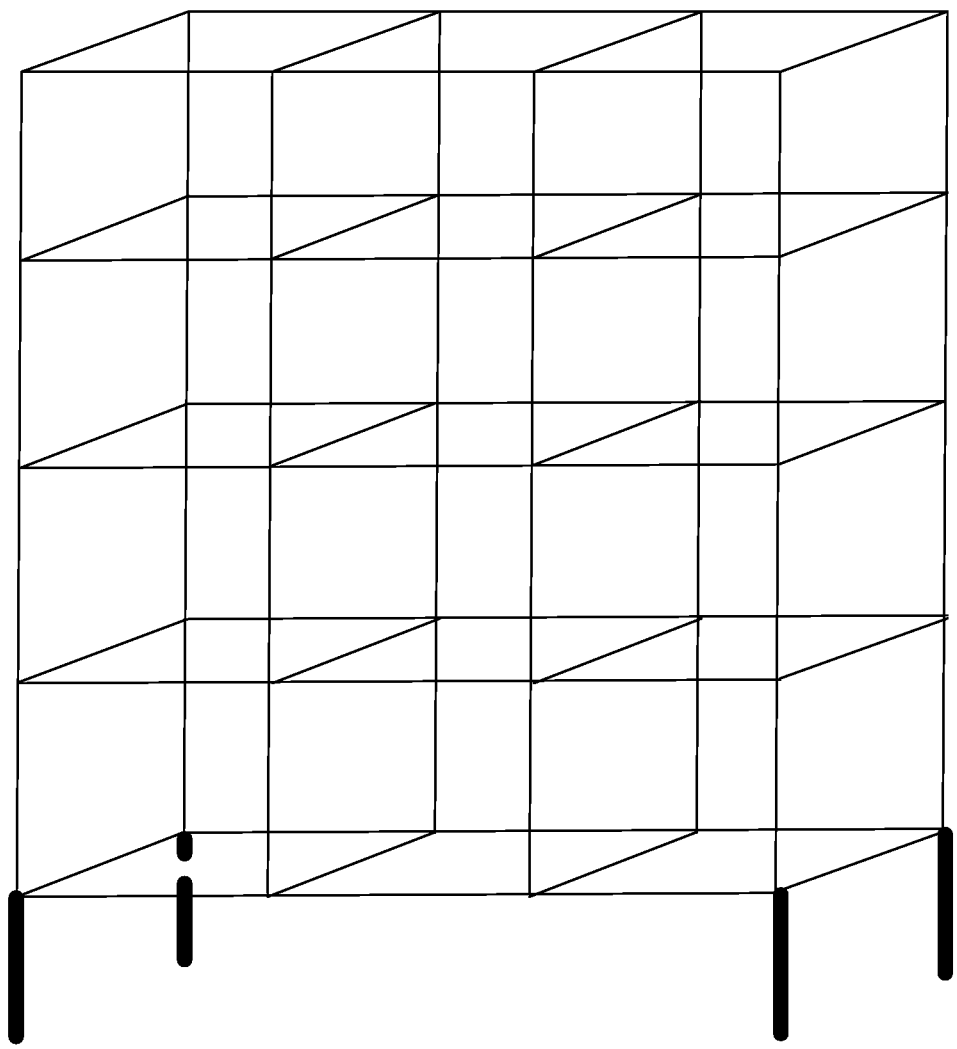
FIG. 2 is a schematic diagram illustrating the structure of a single-opening shelf in accordance with an embodiment of the present application.

The warehousing system illustrated in FIG. 1 may be applied to a variety of suitable cases. For example, in a pick-up scenario, after the shelf 131 is carried to the workstation 140 by the self-driven robot 110, the worker removes an article from the shelf 131 (the article is an order article) and places them into a packaging box for packaging; for another example, in an article storage case, the owner of the article removes the article from the shelf 131 after the shelf 131 is carried to the workstation 140 by the self-driven robot 110, regardless of whether the stored article is temporarily stored or long-term stored. In particular, in the article storage case, in order to ensure privacy and security, one storage container is dedicated to one user's article, or one storage box is dedicated to one user's article, the storage box may be provided with a password lock, and the user may open the storage box by entering a password, reference is made to a single-opening shelf illustrated in FIG. 2.

Because a warehouse where articles are stored has a relatively small space, especially in order to save the space cost brought about by the size of the warehouse space, a "mini-warehouse" may be adopted for storing articles. However, because the shelves for storing articles in the "mini-warehouse" are densely placed, a travelling passage of the robot may be restricted, such that the self-driven robot would not be able to directly move the shelf to be transported. Therefore, there is a need for improving a method for moving an article based on dense storage so as to move the articles in dense storage scenario.

A method and device for moving an article based on dense storage, a computer apparatus, and a storage medium provided in the embodiments of the present application are set forth in detail below by means of the embodiments.

Figure 3:
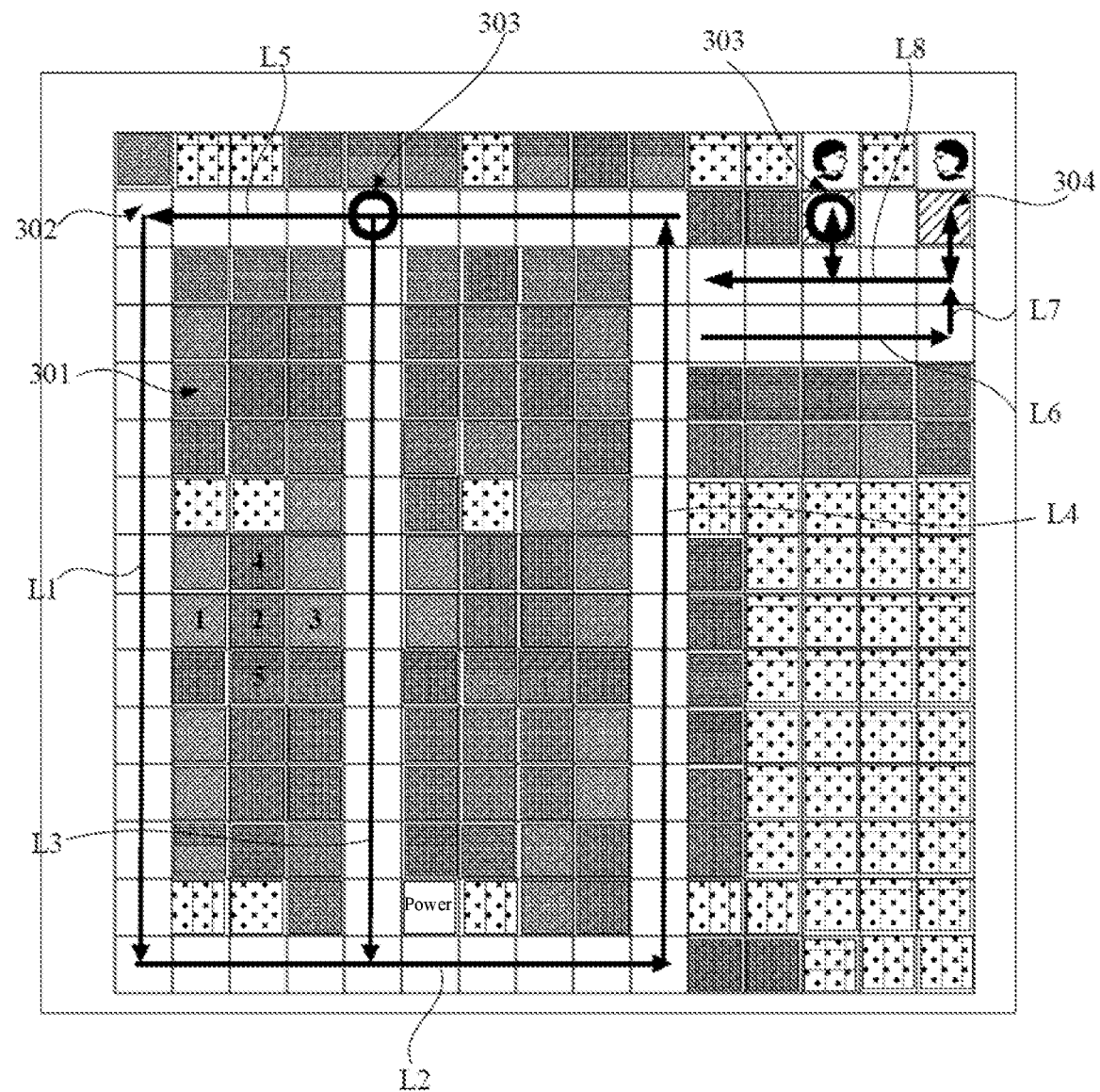
FIG. 3 is a schematic diagram illustrating the layout and transportation of a mini-warehouse in accordance with an embodiment of the present application.

FIG. 3 is a schematic diagram illustrating the layout and transportation of a mini-warehouse in accordance with an embodiment of the present application. Referring to FIG. 3, the mini-warehouse is provided with a shelf area 301, a robot travelling passage 302, a self-driven robot 303, and a workstation 304. Multiple shelves are arranged in the shelf area 301, each of the multiple shelves in the shelf area 301 may be placed in a single column, such as the single column of shelves shown above in FIG. 3. Each of the multiple shelves in the shelf area 301 may also be placed side by side in multiple columns (at least two columns), such as 3 columns of shelves on the left side and 4 columns of shelves in the middle in FIG. 3. The robot travelling passage 302 in FIG. 3 may include a travelling sub-passage L1, a travelling sub-passage L2, a travelling sub-passage L3, a travelling sub-passage L4, a travelling sub-passage L5, a travelling sub-passage L6, a travelling sub-passage L7 and a travelling sub-passage L8. The above-mentioned travelling sub-passages are all one-way travelling passages, and part of the shelves in the shelf area 301 are immediately adjacent to one or both sides of each of the travelling sub-passages. The self-driven robot 303 may move to a position where the shelves are located in directions indicated by the traveling sub-passages in the robot travelling passage 302 so as to carry the shelves. If a shelf to be moved is a shelf that is immediately close to the travelling sub-passage (such as a shelf 1 or a shelf 3), then the self-driven robot 303 may directly move the shelf to be moved to the workstation; however, if a shelf to be moved is not a shelf immediately close to the travelling sub-passage, but is a shelf (for example, a shelf 2) located in the middle of multiple columns of shelves, the shelf to be moved is blocked by the shelf on an outer side at this time, the self-driven robot 303 may not be able to directly move the shelf to be moved, the shelf to be moved may be moved by the self-driven robot 303 only after the shelf blocked on the outer side is moved, and at this time, the shelf to be moved may not be moved by one self-driven robot 303 alone, and the shelf to be moved may be moved by the cooperation of multiple self-driven robots 303. Based on the above-mentioned situation, a first robot, a second robot and a third robot may be used for distinguishing in the subsequent use of multiple self-driven robots 303. For example, the first to the $N_{th}$ (N is a natural number greater than or equal to 1) self-driven robots may first carry the outer blocking shelf away and wind along a one-way passage in a field, and then the $N+1_{th}$ self-driven robot may carry the target shelf away and runs along the one-way passage in the field to the workstation for an appropriate processing operation, for example, in a pick-up scenario, the processing operation may be loading, replenishing, or counting articles. After the processing operation is completed, the $N+1_{th}$ self-driven robot carries the target shelf back to an original place. After the target shelf returns to the original place, the first to the $N_{th}$ self-driven robots carry the outer blocking shelf back to the original place. Of course, the positions of the target shelf and the blocking shelf may also be interchanged.

Figure 4A:
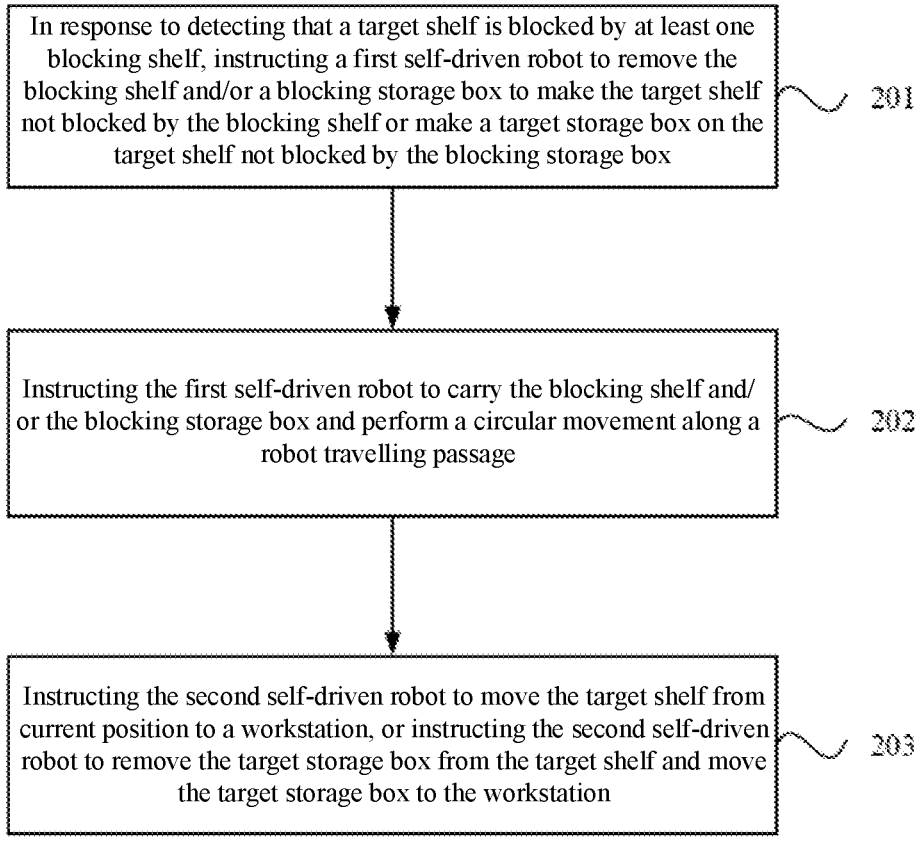
FIG. 4A is a flowchart illustrating a method for moving an article based on dense storage in accordance with an embodiment of the present application.

FIG. 4A is a flowchart illustrating a method for moving an article based on dense storage in accordance with an embodiment of the present application. The method includes step 201 to step 203.

In step 201, upon detecting that a target shelf is blocked by at least one blocking shelf, a first self-driven robot is instructed to remove a blocking shelf and/or a blocking storage box such that the target shelf is not blocked by the blocking shelf or a target storage box on the target shelf is not blocked by the blocking storage box.

Alternatively, regardless of whether the target shelf is blocked by at least one blocking shelf, when it is detected that the target storage box is blocked by at least one blocking storage box, the first self-driven robot may be instructed to remove the at least one blocking storage box so that the target storage box is not blocked by the at least one blocking storage box. The at least one blocking storage box may include a blocking storage box placed on the blocking shelf, or a blocking shelf placed on the target shelf in cases where the target shelf is a double-opening shelf.

In step 202, the first self-driven robot is instructed to carry the blocking shelf and/or the blocking storage box and perform a circular movement on a robot travelling passage.

In step 203, the second self-driven robot is instructed to move the target shelf from a current position to a workstation, or the second self-driven robot is instructed to remove the target storage box from the target shelf and move the removed target storage box to the workstation.

Figure 4B:
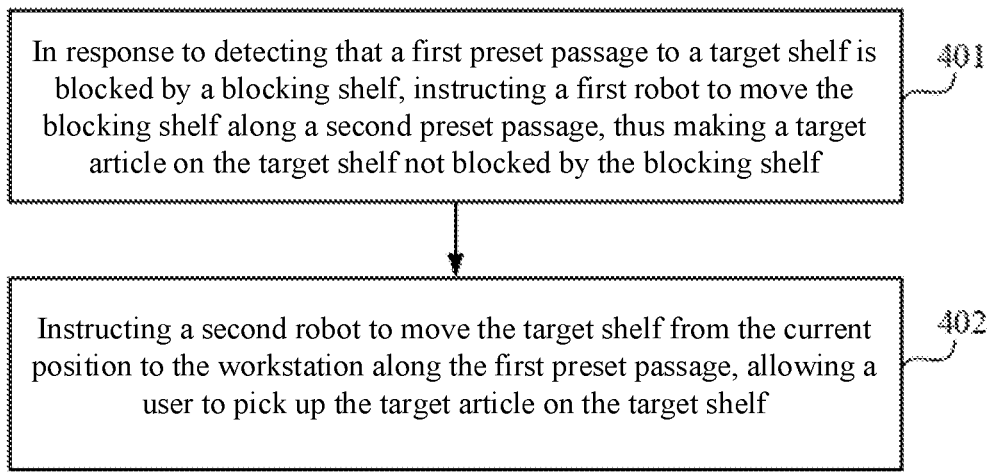
FIG. 4B is a flowchart illustrating another method for moving an article based on dense storage in accordance with an embodiment of the present application.

FIG. 4B is a flowchart illustrating another method for moving an article based on dense storage in accordance with an embodiment of the present application. The method includes step 401 and step 402. The embodiment of the present application may be applied to a case that a self-driven robot acquires articles required by a user in shelves in a case of the densely placed shelves. The method may be performed by an article moving device based on dense storage. The device may be implemented by using software and/or hardware. The device may be integrated into any computer apparatus having a network communication function, and the computer apparatus may be a server configured to control the movement of articles in densely placed shelves, or may be a computer apparatus such as a computer, etc.

In step 401, upon detecting that a target shelf is blocked by a blocking shelf and a first preset passage is blocked, a first self-driven robot is instructed to move the blocking shelf according to a second preset passage so that a target article on the target shelf is not blocked by the blocking shelf, where the first preset passage is a moving passage from a current position of the target shelf to a workstation.

In the embodiment of the present application, referring to FIG. 3, for example, for the target shelf being the shelf 1, when the first self-driven robot 303 or the second self-driven robot 305 carries the shelf 1 of the shelf area 301, due to the fact that there is no other shelf at an outer side of a left side of the shelf 1, the first self-driven robot 303 or the second self-driven robot 305 may travel to the left side of the shelf 1 and move the shelf 1 out, and move the shelf 1 to the workstation 304 along the first preset passage. The first preset passage may be a moving passage between the current position of the target shelf and the workstation. The moving passage between the current position of the target shelf and the workstation may be determined in advance according to a placement position of the target shelf and a position of the workstation, and may also be determined by a real-time positioning of the robot. Exemplarily, for the target shelf as the shelf 1, a route indicated by the first preset passage may be "shelf 1→travelling sub-passage L1→travelling sub-passage L2→travelling sub-passage L4→travelling sub-passage L6→travelling sub-passage L7→workstation 304". Of course, the above merely illustrates one exemplary moving passage from the shelf 1 to the workstation 304. The moving passages from other shelves to the workstations may be determined based on an actual position of the target shelf, a position of the workstation, and directions of the traveling sub-passages in the robot traveling passage 302.

In the embodiment of the present application, referring to FIG. 3, for another example, for the target shelf being the shelf 2, at this time, the shelf 2 is blocked by the shelf 1, the shelf 3, a shelf 4, and a shelf 5, etc., thereby causing a moving passage of the shelf 2 to the workstation 304 to be blocked, i.e. the first preset passage is blocked. To this end, the first self-driven robot 303 may be instructed to move the shelf blocking the shelf 2 according to the second preset passage, so that the moving passage between the shelf 2 and the workstation 304 is not blocked. The first self-driven robot 303 is configured to move the blocking shelf away from an original position according to the second preset passage, thereby ensuring that the moving passage between the current position of the target shelf and the workstation is unobstructed. The second preset passage may be set according to the actual situation, such as a winding passage in a certain direction on the travelling passage 302 of the self-driven robot. Exemplarily, a route indicated by the second preset passage may be "travelling sub-passage L1→travelling sub-passage L2→travelling sub-passage L4→travelling sub-passage L5→travelling sub-passage L1"; the route indicated by the second preset passage may also be "traveling sub-passage L3→traveling sub-passage L2→traveling sub-passage L4→traveling sub-passage L5→traveling sub-passage L3", where the route indicated by the second preset passage may also be the combination of the two moving passages in the above-mentioned example, which are not to be detailed herein again. Of course, the above merely illustrates one moving passage which winds around the field in the directions indicated by the arrows of the preset travelling sub-passages. The other second preset passages are not listed here, as long as it is satisfied that the blocking shelf does not block the target shelf when moving along the second preset passage.

In an embodiment of the present application, the step where upon detecting that the target shelf is blocked by the blocking shelf and the first preset passage is blocked, the first self-driven robot is instructed to move the blocking shelf according to the second preset passage may include step 4011a and step 4011b (not shown in FIG. 4B).

In step 4011a, upon detecting that the target shelf is blocked by the blocking shelf and the first preset passage is blocked, the first self-driven robot is instructed to travel to a shelf area where the blocking shelf located outside the target shelf and blocking the target shelf is located, and remove the blocking shelf from the shelf area where the blocking shelf is located.

In this embodiment, when a moving instruction to move a target article is received, it may be detected whether the target shelf corresponding to the target article is blocked by the blocking shelf and the first preset passage is blocked, that is, it may be detected whether there are all blocking articles outside the target shelf. When it is detected that the target shelf is blocked by the blocking shelf and the first preset passage is blocked, the first self-driven robot may be instructed to travel to the shelf area where the blocking shelf located outside the target shelf and blocking the target shelf is located, and remove the blocking shelf from the shelf area where the blocking shelf is located.

Exemplarily, referring to FIG. 3, assuming that the target shelf corresponding to the target article is the shelf 2, the first preset passage may be "shelf 2→shelf 1→travelling sub-passage L1→travelling sub-passage L2→travelling sub-passage L4→travelling sub-passage L6→travelling sub-passage L7→workstation 304". At this time, the blocking shelf on the first preset passage described above is the shelf 1; the first preset passage may also be "shelf 2→shelf 3→travelling sub-passage L3→travelling sub-passage L2→travelling sub-passage L4→travelling sub-passage L6→travelling sub-passage L7→workstation 304". At this time, the blocking article on the first preset passage described above is the shelf 3. When the shelf 2 needs to be moved, the shelf 1 or the shelf 3 needs to be removed first, so as to ensure an unblocked passage from the shelf 2 to the travelling sub-passage L2, or the unblocked passage from the shelf 2 to the travelling sub-passage L3. Based on the above situation, upon detecting that the shelf 2 is blocked by the blocking shelf (such as the shelf 1 or the shelf 3) and the first preset passage is blocked, the first self-driven robot 303 may be instructed to travel to the shelf area where the blocking shelf located outside the shelf 2 and blocking the shelf 2 (such as the shelf 1 or the shelf 3) is located. After the first self-driven robot 303 travels to the shelf area where the blocking shelf (such as the shelf 1 or the shelf 3) is located, it may continue to remove the blocking shelf (such as the shelf 1 or the shelf 3) from the shelf area where the blocking shelf is located so as to ensure that the shelf 2 is not blocked by the block shelf (such as the shelf 1 or the shelf 3).

In step 4011b, the first self-driven robot is instructed to carry out the moving of the moved-out blocking shelf around the robot travelling passage according to the second preset passage.

In this embodiment, when the first self-driven robot is instructed to remove the blocking shelf from the shelf area where the blocking shelf is located, in order to prevent the moved out blocking shelf from blocking the moving passage between the current position of the target shelf and the workstation, the first self-driven robot may be instructed to carry out the moving of the moved-out blocking shelf around the robot travelling passage according to the second preset passage. The second preset passage is a one-way travelling passage, that is, the first self-driven robot may move in a one-way winding when it moves the blocking shelf.

Exemplarily, referring to FIG. 3, taking the target shelf as the shelf 2 and the blocking shelf as the shelf 1 as an example, after the shelf 1 is moved out of an original shelf area, the first self-driven robot 303 may carry the shelf 1 into the robot travelling passage 302. After the shelf 1 enters the robot travelling passage 302, the first preset passage may be blocked again, resulting in that the moving passage between the current position of the target shelf and the workstation is still blocked. Based on the above situation, the first self-driven robot 303 may be instructed to move the shelf 1 in a manner of an one-way winding according to the second preset passage shown in "travelling sub-passage L1→travelling sub-passage L2→travelling sub-passage L4→travelling sub-passage L5→travelling sub-passage L1", such that the shelf 1 will no longer block the first preset passage during the circular movement. Referring to FIG. 3, taking the target shelf as shelf 2 and the blocking shelf as shelf 3 as an example, after the shelf 3 is moved out of an original shelf area, the first self-driven robot 303 may carry the shelf 3 into the robot travelling passage 302, and after the shelf 3 enters the robot travelling passage 302, the first preset passage may be blocked again, resulting in that the moving passage between the current position of the target shelf and the workstation is still blocked. Based on the above situation, the first self-driven robot 303 may be instructed to move the shelf 3 in a manner of an one-way winding according to the second preset passage shown in order of "travelling sub-passage L3→travelling sub-passage L2→travelling sub-passage L4→travelling sub-passage L5→travelling sub-passage L3", such that the shelf 3 will no longer block the first preset passage during the circular movement.

In the embodiment of the present application, upon detecting that the target shelf is not blocked by the blocking shelf and the first preset passage is not blocked, any one of the self-driven robots may be directly instructed to travel to the shelf area where the target shelf is located, so as to directly move out the target shelf from the current position of the target shelf and move the target shelf to the workstation according to the first preset passage. Exemplarily, referring to FIG. 3, assuming that the target shelf is shelf 1, the right, upper, and lower sides of the shelf 1 are blocked by the shelf 3, the shelf 4, and the shelf 5, respectively, but the left side of the shelf 1 is not blocked by other shelves. At this time, it may be considered that the shelf 1 is not blocked by the blocking shelf and the first preset passage is not blocked. Based on the above situation, any one of the self-driven robots 303 may be instructed to travel to a position where the shelf 1 is located, and move the shelf 1 out of the shelf area, and move the shelf 1 from the current position of the shelf 1 to the workstation 304 in a direction indicated by the first preset passage shown in order of "shelf 1→travelling sub-passage L1→travelling sub-passage L2→travelling sub-passage L4→travelling sub-passage L6→travelling sub-passage L7→workstation 304". Of course, the above only illustrates one exemplary moving passage from the shelf 1 to the workstation 304. The moving passages from other shelves to the workstations may be set based on an actual position of the target shelf, a position of the workstation, and directions of the traveling sub-passages in the robot traveling passage 302.

In step 402, the second self-driven robot is instructed to move the target shelf from the current position to the workstation according to the first preset passage, such that the user may pick up the target article on the target shelf.

In the embodiment of the present application, referring to FIG. 3, for the target shelf as the shelf 2, the blocking shelf may be the shelf 1 on the left side of the shelf 2 or also may be the shelf 3 on the right side of the shelf 2. When the blocking shelf is the shelf 1 on the left of the shelf 2, a route indicated by the first preset passage may be "shelf 2→shelf 1→travelling sub-passage L1→travelling sub-passage L2→travelling sub-passage L4→travelling sub-passage L6→travelling sub-passage L7→workstation 304"; when the blocking shelf is the shelf 3 at the right of the shelf 2, a route indicated by the first preset passage may be "shelf 2→shelf 3→travelling sub-passage L3→travelling sub-passage L2→travelling sub-passage L4→travelling sub-passage L6→travelling sub-passage L7→workstation 304".

In the embodiment of the present application, referring to FIG. 3, after the first self-driven robot 303 is instructed to move the blocking shelf (for example, the shelf 1 or the shelf 3) according to the second preset passage, such that the target shelf is not blocked by the blocking shelf, the second self-driven robot may be instructed to transport the target shelf from the current position to the workstation according to the first preset passage, so as to get the target article from the target shelf or the storage box on the target shelf.

It should be noted that the above merely illustrates two exemplary moving passages from the shelf 2 to the workstation 304. The moving passages from other shelves to the workstations may be set based on an actual position of the target shelf, a position of the workstation, and travelling directions of the traveling sub-passages in the self-driven robot traveling passage 302.

In an embodiment of the present application, the step that the second self-driven robot is instructed to move the target shelf from the current position to the workstation according to the first preset passage, so that the user picks up the target article on the target shelf may include step 4021a and step 4021b (not shown in FIG. 4B).

In step 4021a, upon detecting that the blocking shelf is moved, the second self-driven robot is instructed to travel to the shelf area where the target shelf is located, and move the target shelf out of the shelf area where the target shelf is located.

In step 4021b, the second self-driven robot is instructed to move the removed target shelf from the current position to the workstation according to the first preset passage, such that the user may pick up the target article on the target shelf, where the target article is stored on the target shelf.

In this embodiment, referring to FIG. 3, taking the target shelf as the shelf 2 and the blocking shelf as the shelf 1 as an example, upon detecting that the first self-driven robot 303 carries the shelf 1 and performs a circular movement on the robot travelling passage according to the second preset passage, the second self-driven robot 303 may be instructed to travel to a position where the shelf 2 is located and may move the shelf 2 out of the shelf area where the shelf 2 is located. After the second self-driven robot 303 moves the shelf 2 out of the shelf area where the shelf 2 is located, the second self-driven robot 303 may continue to be instructed to move the shelf 2 from the current position of the shelf 2 to the workstation 304 according to a transportation passage in order of "shelf 2→travelling sub-passage L1→travelling sub-passage L2→travelling sub-passage L4→travelling sub-passage L6→travelling sub-passage L7→workstation 304" such that the user may pick up the target article from the shelf 2.

In this embodiment, for the shelf of this embodiment, a shelf of only one box may be placed on each level of the shelf, and only one opening is provided on a side of each shelf; two storage boxes or even more storage boxes may also be placed on each level of the shelf, and two sides of each shelf are respectively provided with one opening. It is assumed that there is one opening one each of the two sides of the shelves, after the target shelves are moved and arrive at the workstation, only the target shelf needs to be rotated, and the storage box corresponding to the target shelf may be picked up.

In an embodiment of the present application, after detecting that the user has picked up the target article at the workstation, the second self-driven robot is first instructed to place the target shelf corresponding to the target article back to an original position again, and then the first self-driven robot is instructed to place the blocking shelf back to an original position again. Alternatively, after detecting that the user picks up the target article at the workstation, the first self-driven robot is first instructed to place the blocking shelf back to the original position where the target shelf corresponding to the target article is located, and then the second self-driven robot is instructed to place the target article corresponding to the target shelf back to the original position where the blocking shelf is located. At this time, the placement position of each shelf in the shelf information table needs to be updated.

In another embodiment of the present application, the step that the second self-driven robot is instructed to move the target shelf from the current position to the workstation according to the first preset passage, so that the user may pick up the target article on the target shelf may include step 4022a and step 4022b (not shown in FIG. 4B).

In step 4022a, upon detecting that the blocking shelf is moved, the second self-driven robot is instructed to travel to the shelf area where the target shelf is located, and remove the target storage box from the target shelf, where the target storage box is placed on the target shelf.

In step 4022b, the second self-driven robot is instructed to move the removed target storage box from the current position to the workstation along the first preset passage, where the target article is stored in the target storage box.

In this embodiment, referring to FIG. 3, taking the target shelf as the shelf 2 and the blocking shelf as the shelf 1 as an example, upon detecting that the first self-driven robot 303 carries the shelf 1 and performs a circular movement on the robot travelling passage along the second preset passage, the second self-driven robot 303 may be instructed to travel to a position where the shelf 2 is located, and may remove the target storage box placed on the target shelf from the shelf 2. After the second self-driven robot 303 removes the target storage box from the shelf 2, the second self-driven robot 303 may continue to be instructed to move the removed target storage box from the position where the shelf 2 is located to the workstation 304 according to the first preset passage as the transportation passage in order of "shelf 2→travelling sub-passage L1→travelling sub-passage L2→travelling sub-passage L4→travelling sub-passage L6→travelling sub-passage L7→workstation 304", such that the user may pick up the target article from the target storage box. It should be noted that, for the shelf of this embodiment, a shelf of only one box may be placed on each level of the shelf, and only one opening is provided on a side of each shelf.

In an embodiment of the present application, after detecting that the user has picked up the target article at the workstation, the second self-driven robot is first instructed to place the target storage box corresponding to the target article back to an original position again, i.e., place target storage box corresponding to the target article back to the original target shelf, and then the first self-driven robot is instructed to place the blocking shelf back to an original position again.

In an embodiment of the present application, after detecting that the user has picked up the target article at the workstation, the second self-driven robot is first instructed to place the target shelf or the target storage box on the target shelf to the original position, and the first self-driven robot is instructed to place the blocking shelf and/or the blocking storage box back to the original position.

In an embodiment of the present application, a manipulator may be provided on the workstation. After the shelf is moved to the workstation by the self-driven robot 303, the user's required articles may be grabbed from the shelf by using the manipulator provided on the workstation and placed on the shelf, so that the user or the staff may pick up the articles from the shelf. Alternatively, after the shelf is moved to the workstation by the self-driven robot 303, the user's needed storage box may be grabbed from the shelf by using the manipulator provided on the workstation and placed on the shelf, and then the user's needed articles may be removed from the storage box by the user or by means of the manipulator. The article may be a product in a warehouse (such as a product sorted in a regular logistics warehouse) or a user's personal article. At this time, the target shelf or target article storage box is similar to a personal safe, and the person picking up the target article at the workstation is the owner of the article.

In an embodiment of the present application, when the first self-driven robot make the moved out blocking shelf perform the circular movement on the robot travelling passage along the second preset passage, and when the second self-driven robot is moving the removed target shelf or target storage box to the workstation along the first preset passage, since the first self-driven robot may carry the blocking shelf to perform a circular movement on the robot travelling passage during the whole time, there may be a case where the first self-driven robot and the second self-driven robot meet at a junction of each traveling sub-passage of the robot travelling passage 302, and at this time, it is necessary to determine which self-driven robot to pass through in priority. For example, referring to FIG. 3, during a process of the first self-driven robot 303 carrying the shelf 1 or the shelf 3 to move around, and the second self-driven robot 303 moving the shelf 2 or the storage box on the shelf 2, the first self-driven robot 303 and the second self-driven robot 303 may meet at a junction of the traveling sub-passage L4 and the traveling sub-passage L7. Based on the above situation, in order to ensure that the target shelf or the target storage box may be moved in time when the first self-driven robot and the second self-driven robot meet, the priority of the target shelf or the target storage box may be set higher than the priority of the blocking shelf, and correspondingly, the priority of the second self-driven robot carrying the target shelf or the target storage box is also higher than the priority of the first self-driven robot carrying the blocking shelf. When the first self-driven robot meets the second self-driven robot, the target shelf or target storage box moved by the second self-driven robot passes through in priority.

In addition, since the user picks up the target article from the target shelf or the target storage box at the workstation, the user needs to return the target shelf or the target storage box to the original place again. By setting the priority of the target shelf or target storage box to be higher than the priority of the blocking shelf, the second self-driven robot may be instructed to return the target shelf or target storage box to the original position in turn according to the priority, and the first self-driven robot is instructed to return the blocking shelf to its original location. It should be noted that the priority of each shelf or the storage box on each shelf may be set according to the order in which each shelf or each storage box is moved out. The priority of the shelf or the storage box moved out earlier is small, and the priority of the shelf or the storage box moved out later is large.

Figure 5:
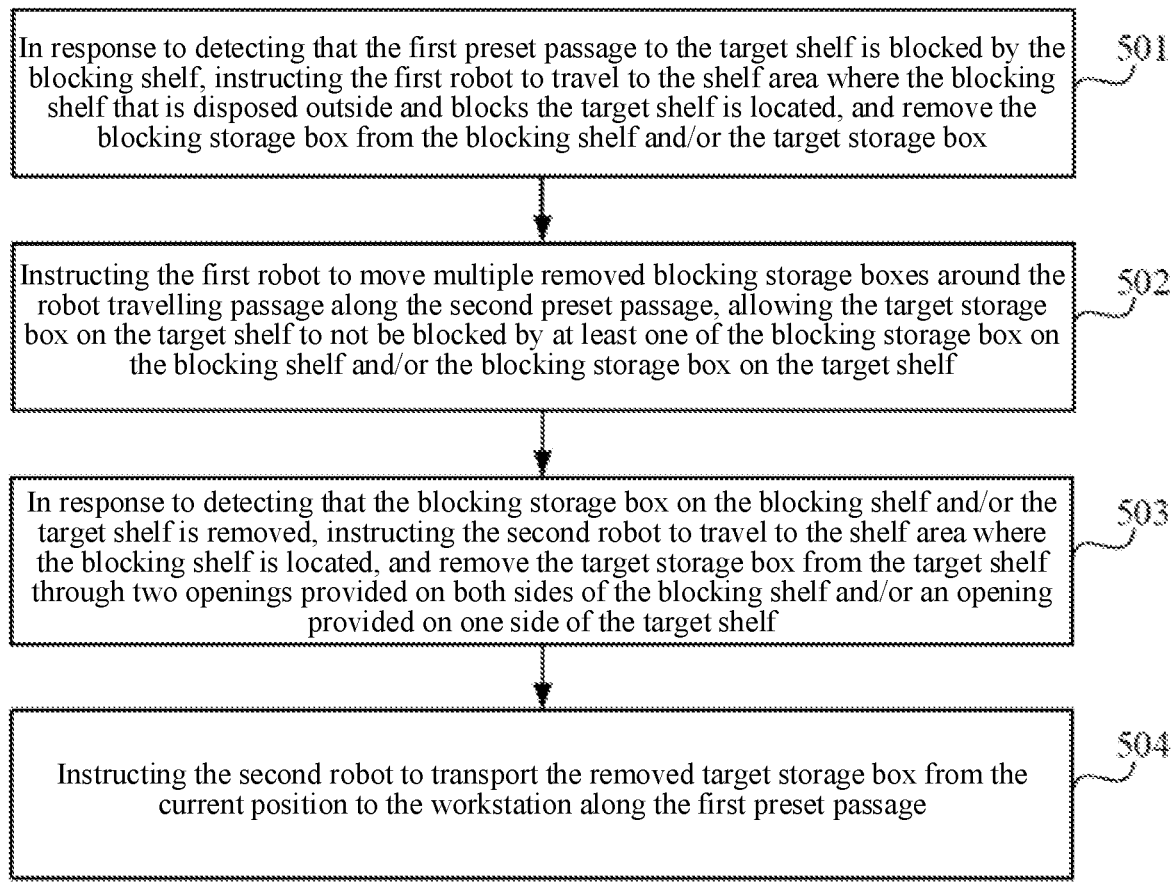
FIG. 5 is a flowchart illustrating yet another method for moving an article based on dense storage in accordance with an embodiment of the present application.

FIG. 5 is a flowchart illustrating another method for moving an article based on dense storage in accordance with an embodiment of the present application. Based on the above embodiment, the embodiment of the present application details the steps in which the first self-driven robot is instructed to move the blocking article according to the second preset passage and the second self-driven robot is instructed to transport the target article from the current position to the workstation according to the first preset passage.

In addition to carry the shelf to the workstation, the self-driven robot may also pick up the storage boxes on the shelves and carry the storage boxes to the workstations, so that the staff at the workstation or the owner of the articles may remove the articles from the storage box. Here, the self-driven robot may take the storage box off the shelf by means of various manipulators or robotic arm structures. For the storage box on the shelf in the middle column, or the inner storage boxes on the two-way shelf beside the passage, they may not be removed directly because they are blocked by other storage boxes. Therefore, the target storage box to be removed needs to be removed by carrying away the blocked storage box and/or the blocked shelf.

As illustrated in FIG. 5, the method for moving the article based on the dense storage in the embodiment of the present application may include step 501 to step 504.

In step 501, upon detecting that the target shelf is blocked by the blocking shelf and the first preset passage is blocked, the first self-driven robot is instructed to travel to a shelf area where the blocking shelf that is located outside the target shelf and that blocks the target shelf is located, and to remove the blocking storage box from the blocking shelf and/or the target storage box.

Both sides of the blocking shelf and the target shelf is each provided with one opening, and the blocking storage box is placed on the blocking shelf, and the blocking storage box and/or the target storage box are placed on the target shelf.

In the embodiment of the present application, referring to FIG. 3, it is assumed that the target shelf is the shelf 2 and the blocking shelf may be the shelf 1, since the target shelf and the blocking shelf in this embodiment are two-sided open shelves, i.e., two sides are respectively provided with one opening and multiple storage boxes are placed on the two-sided open shelves, multiple storage boxes may be placed on the target shelf and the blocking shelf. It should be noted that the storage boxes on the target shelf may include a target storage box and a blocking storage box. For example, the target shelf may be the shelf 2, and the blocking shelf may be the shelf 1, if the target storage box is located on the right side of the shelf 2, then the storage box placed on the left side of the shelf 2 may be understood as the blocking storage box placed on the target shelf. At this time, not only need to move the blocking storage box on the blocking shelf (such as the shelf 1), but also need to remove some of the blocking storage box included in the target shelf. As long as the blocking storage box located outside the target storage box is moved away, the smoothness of the moving passage between the location of the target storage box storing the target article and the workstation may be ensured.

Based on the above situation, upon detecting that the target shelf is blocked by the blocking shelf (for example, the shelf 1) and the first preset passage is blocked, the first self-driven robot 303 may be instructed to travel to a position where the blocking shelf (for example, the shelf 1) is located. After the first self-driven robot 303 travels to the shelf area where the blocking shelf (such as shelf 1) is located, the first self-driven robot 303 may be instructed to remove all the blocking storage boxes placed on the blocking shelf from the blocking shelf and remove part of the blocking storage boxes from the target shelf (such as the shelf 2) so as to ensure that the target storage box on the target shelf (such as the shelf 2) is not blocked by the blocking storage box on the blocking shelf and by the part of the blocking storage box from the target shelf. Among them, the first preset passage may be a passage composed of "shelf 2→shelf 1→travelling sub-passage L1→travelling sub-passage L2→travelling sub-passage L4→travelling sub-passage L6→travelling sub-passage L7→workstation 304". At this time, the blocking storage box on the first preset passage may be a storage box on the shelf 1 and/or a storage box on the left side of the shelf 2.

In step 502, the first self-driven robot is instructed to move the multiple removed blocking storage boxes around the robot travelling passage along the second preset passage, such that the target storage box on the target shelf is not blocked by the blocking shelf and/or blocking storage box on the target shelf.

In the embodiment of the present application, referring to FIG. 3, after the first self-driven robot 303 removes the blocking storage box from the blocking shelf and/or the target shelf, in order to avoid the removal of the blocking storage box from blocking a moving passage between the target storage box to the workstation, the first self-driven robot 303 may be instructed to move the removed blocking article storage box around on the robot running passage according to the second preset passage. Exemplarily, taking the target shelf as the shelf 2 and the blocking shelf as the shelf 1 as an example, since each shelf is densely arranged, when the first self-driven robot 303 removes the blocking storage box on the shelf 1 and/or the shelf 2, only the blocking storage box may be placed on the robot travelling passage 302. However, the static placement of the blocking storage box on the robot travelling passage 302 will inevitably affect the normal movement of other self-driven robots 303, and the static placement of the blocking storage box on the robot travelling passage 302 may cause a moving passage between the target storage box and the workstation to be blocked. Based on the above situation, the first self-driven robot 303 may be instructed to move the removed blocking storage box in a manner of an unidirectional circulation loop according to the second preset passage shown in order of "travelling sub-passage L1→travelling sub-passage L2→travelling sub-passage L4→travelling sub-passage L5→travelling sub-passage L1", such that the removed storage box will not block the first preset passage again during the movement of the coil. It should be noted that, for specific explanation about the first preset passage and the second preset passage, reference may be made to the explanation of the first preset passage and the second preset passage in the foregoing embodiment, and details are not described herein again.

Figure 6:
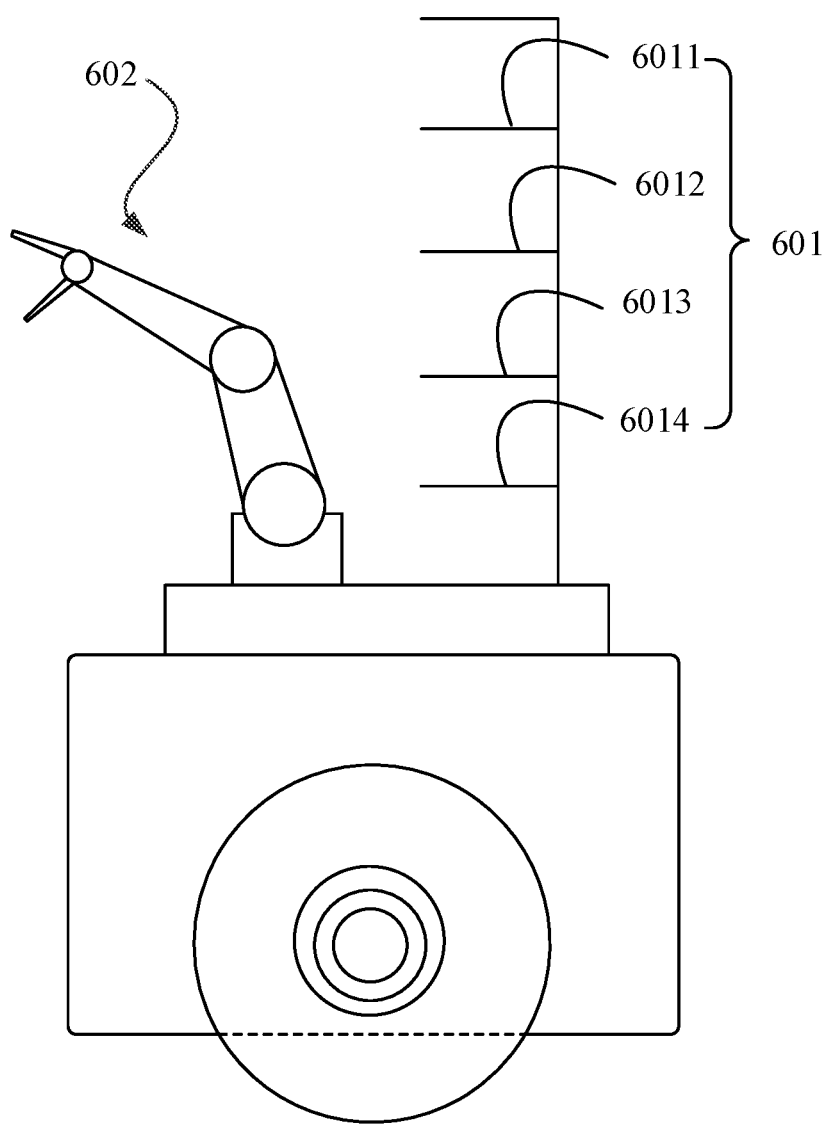
FIG. 6 is a schematic diagram illustrating a self-driven robot that performs a method for moving an article based on dense storage in accordance with an embodiment of the present application.

In the embodiment of the present application, FIG. 6 is a schematic diagram illustrating a self-driven robot that performs a method for moving an article based on dense storage in accordance with an embodiment of the present application. Referring to FIG. 3, taking the self-driven robot in FIG. 6 as the first self-driven robot 303 shown in FIG. 3 as an example, the self-driven robot in FIG. 6 may be provided with a manipulator 602, and the first self-driven robot 303 may grasp the blocking storage box from the blocking shelf through the manipulator 602, and the removed blocking storage box may be placed on each accommodation position 6011, 6012, 6013, 6014 of the accommodation device 601 illustrated in FIG. 6. The first self-driven robot 303 may cause the multiple removed blocking storage box to perform a circular movement on the robot travelling passage according to the second preset passage, such that the moving passage between the target storage box and the workstation is not blocked. Of course, the type of the first self-driven robot 303 may not be limited to the self-driven robot shown in FIG. 6, as long as the first self-driven robot 303 may achieve the functions of grasping and accommodating the blocking storage box.

In step 503, upon detecting that the blocking storage box on the blocking shelf and/or the target shelf is moved, the second self-driven robot is instructed to travel to the shelf area where the blocking shelf is located, and remove the target storage box from the target shelf via two openings on both sides of the blocking shelf and/or an opening on the side of the target shelf.

In step 504, the second self-driven robot is instructed to move the removed target storage box from the current position to the workstation according to the first preset passage, where the target article is stored in the target storage box, and the target storage box is placed on the target shelf.

In the embodiment of the present application, referring to FIG. 3, taking the target shelf as the shelf 2 and the blocking shelf as the shelf 1 as an example, upon detecting that the blocking storage box on the shelf 1 and/or the blocking storage box on the shelf 2 are carried by the first self-driven robot 303 and perform a circular movement on each of the travelling sub-passages of the robot travelling passage 302 according to the second preset passage, the second self-driven robot 303 may be instructed to travel to the position where the shelf 1 is located and pass over two opening of the blocking shelf (such as the shelf 1) and remove the target storage box from the shelf 2. After the second self-driven robot 303 removes the target storage box from the shelf 2, the second self-driven robot 303 may continue to instruct the second self-driven robot 303 to move the removed target storage box to the workstation according to the transport passage shown in order of "shelf 2→travelling sub-passage L1→travelling sub-passage L2→travelling sub-passage L4→travelling sub-passage L6→travelling sub-passage L7→workstation 304" such that the user may pick up the target article from the target storage box. It should be noted that, for the shelf of this embodiment, two storage boxes or even more storage boxes are placed on each level of the shelf, and two sides of each shelf are respectively provided with one opening. For example, the shelf has two openings on both sides, and two storage boxes are placed on each level. If one wants to remove the inner storage box, the first self-driven robot is instructed to remove the outer storage box.

In an embodiment of the present application, after detecting that the user has picked up the target article at the workstation, the second self-driven robot is first instructed to place the target storage box corresponding to the target article back to the original shelf, and then the first self-driven robot is instructed to place the blocking article back on the original shelf. Alternatively, after it is detected that the user picks up the target article at the workstation, the first self-driven robot is first instructed to place the blocking storage box back on the target shelf corresponding to the target article, and then the second self-driven robot is instructed to place the target storage box corresponding to the target article back to the blocking shelf. At this time, it is needed to update the storage boxes placed on each shelf in the shelf information table.

Figure 7A:
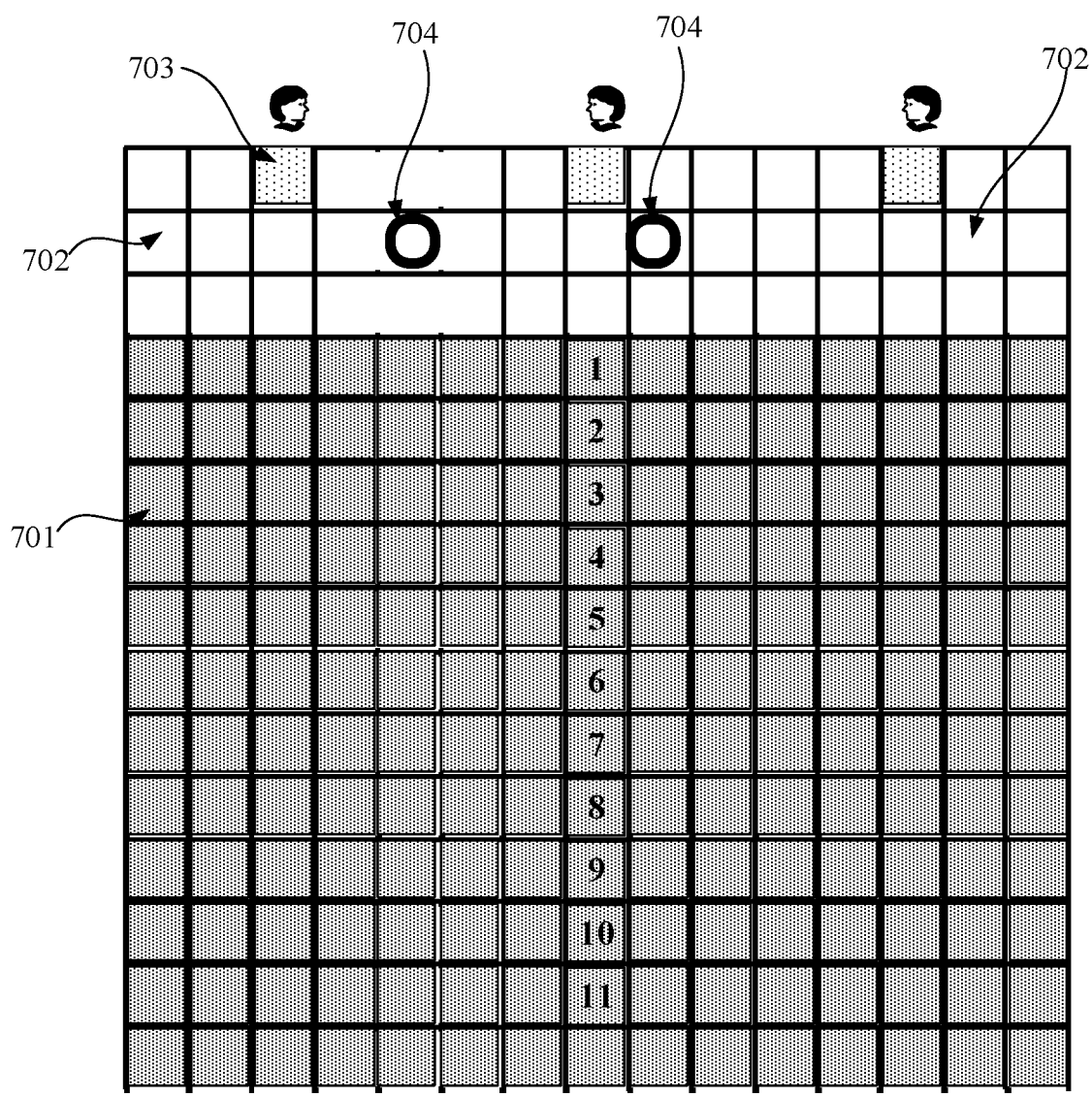
FIG. 7A illustrates the layout of another mini-warehouse in accordance with an embodiment of the present application.
Figure 7B:
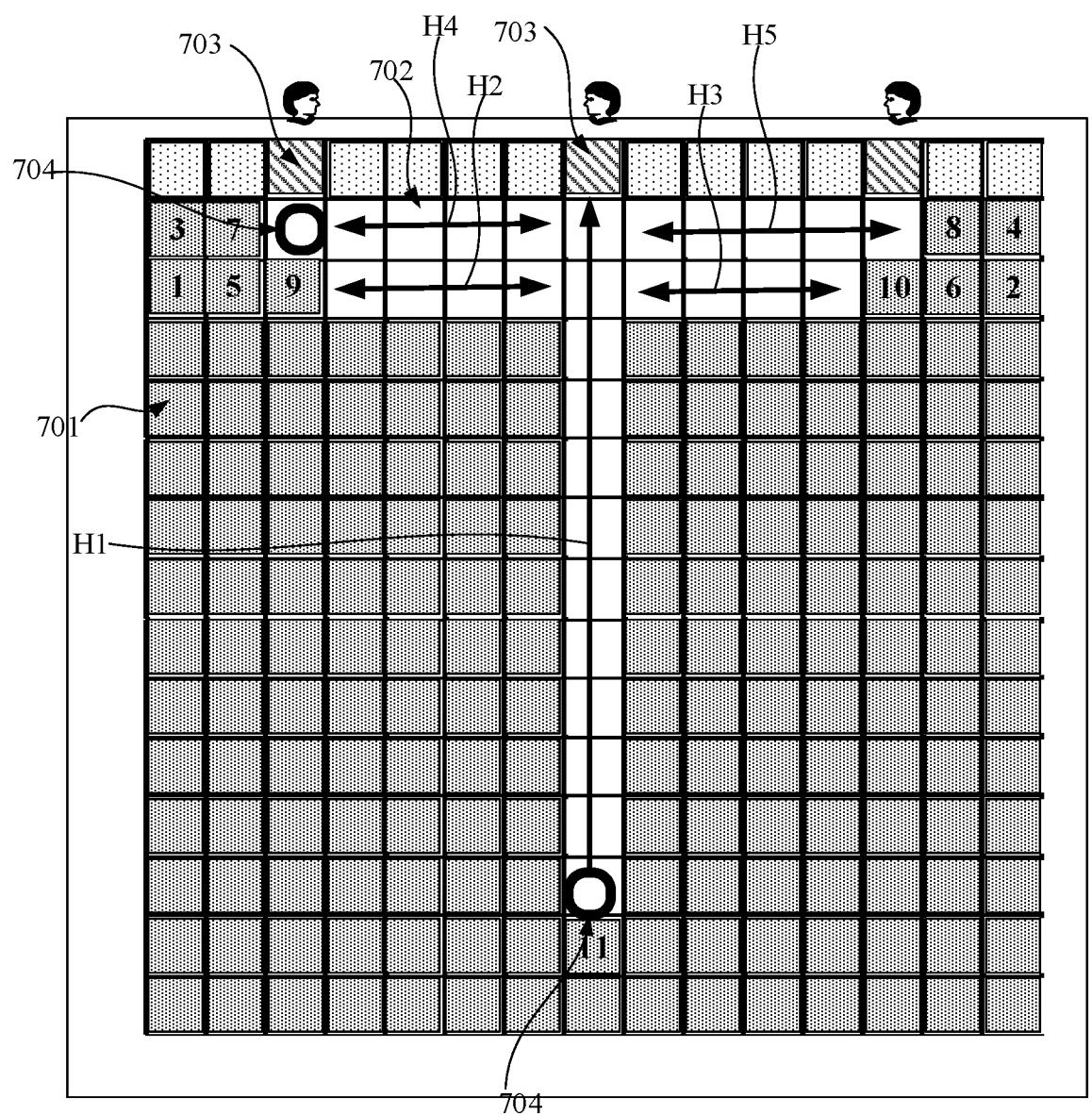
FIG. 7B is a schematic diagram illustrating the transportation in a mini-warehouse in accordance with an embodiment of the present application.

FIG. 7A is the layout of another mini-warehouse in accordance with an embodiment of the present application. Referring to FIG. 7A, a shelf area 701, a shelf temporary placement area 702, a workstation 703 and a self-driven robot 704 are illustrated in FIG. 7A. Multiple shelves are provided in the shelf area 701. Each shelf in the shelf area 701 is highly densely distributed on a side of the warehouse. There is no robot travelling passage between the shelves, and only a certain area of the warehouse (such as one side of the warehouse shown in FIG. 7A) is provided with the shelf temporary placement area 702, and the self-driven robot 704 may move the shelf to the shelf temporary placement area 702. FIG. 7B is a schematic diagram showing the carrying in a mini-warehouse in accordance with an embodiment of the present application. Referring to FIG. 7B, if the shelf needing to be moved is a shelf (such as the shelf 11) inside the shelf area 701, then the self-driven robot 704 needs to first move the shelf 1, the shelf 2, . . . , the shelf 10, etc., to the shelf temporary placement area 702, and then move the shelf 11 to the workstation 703. Since it may not be possible to achieve a single carrying only rely on the single self-driven robot 303, the self-driven robot 303 needs to be coordinated for multiple carries to complete it. Based on the above-mentioned situation, a first robot, a second robot and a third robot may be used for distinguishing in the subsequent use of multiple self-driven robots 303.

For example, the first to the $N_{th}$ (N is a natural number greater than or equal to 1) self-driven robots may carry the blocking shelf located on the carrying passage of the target shelf one by one to the shelf temporary placement area, and then the $N+1_{th}$ self-driven robot may carry the target shelf to the workstation for an appropriate processing operation, for example, in a pick-up scenario, the processing operation may be loading, replenishing, or counting articles. After the processing operation is completed, the $N+1_{th}$ self-driven robot carries the target shelf back to an original place. After the target shelf returns to the original place, the first to the $N_{th}$ self-driven robots carry the outer blocking shelf back to the original place. Of course, the target shelf and the blocking shelf may not be moved back to the original place, but may be placed at any free position in the warehouse.

Figure 8:
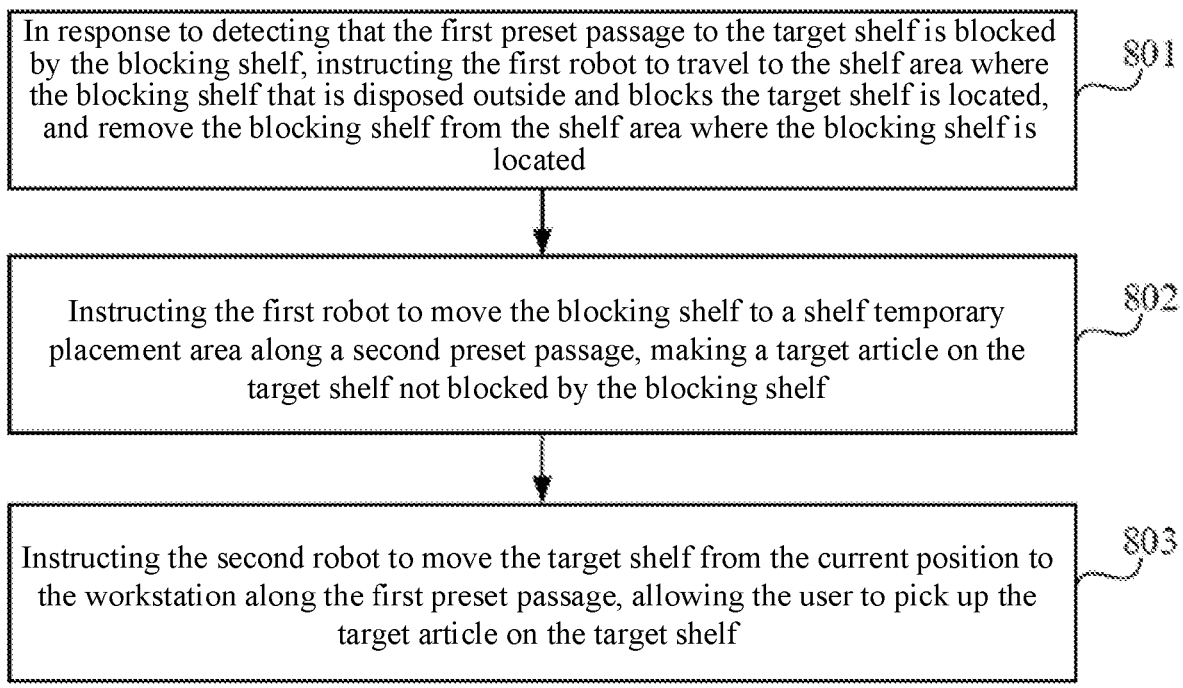
FIG. 8 is a flowchart illustrating still another method for moving an article based on dense storage in accordance with an embodiment of the present application.

FIG. 8 is a flowchart illustrating still another method for moving an article based on dense storage in accordance with an embodiment of the present application. Based on the above embodiment, the embodiment of the present application details the steps in which the first self-driven robot is instructed to move the blocking article according to the second preset passage and the second self-driven robot is instructed to transport the target article from the current position to the workstation according to the first preset passage.

As illustrated in FIG. 8, the method for moving the article based on the dense storage in the embodiment of the present application may include step 801 to step 803.

In step 801, upon detecting that the target shelf is blocked by the blocking shelf and the first preset passage is blocked, the first self-driven robot is instructed to travel to a shelf area where the blocking shelf located outside the target shelf and blocking the target shelf is located, and to remove the blocking shelf from the shelf area where the blocking shelf is located.

The first preset passage is a moving passage from the current position of the target shelf to the workstation.

In step 802, the first self-driven robot is instructed to move the blocking shelf to the shelf temporary placement area according to the second preset passage, so that the target article on the target shelf are not blocked by the blocking shelf.

In the embodiment of the present application, referring to FIG. 7A and FIG. 7B, upon detecting that the target shelf is blocked by the blocking shelf and the first preset passage is blocked, the first self-driven robot may be instructed to travel to a shelf area where the blocking shelf located outside the target shelf and blocking the target shelf is located, and to move the blocking shelf from the shelf area where the blocking shelf is located to the shelf temporary placement area, such that the target shelf is not blocked by the blocking shelf. Exemplarily, it is assumed that the target shelf is the shelf 11, the blocking shelf is the shelf 1, the shelf 2, . . . , the shelf 10, etc., and the first preset passage is the transport passage H1 from the target shelf to the workstation. Since it is detected that the target shelf is blocked by the blocking shelf and the first preset passage is blocked. If one wants to pick up the shelf 11 at the position of the shelf 11 or the target storage box on the shelf 11, it is necessary to remove the shelves, such as the shelf 1, the shelf 2, . . . , the shelf 10, etc., away from the corresponding shelf area and place in the shelf temporary placement area 702. The first self-driven robot 704 may be instructed to travel to the position where the shelf 1 is located, remove the shelf 1 from the shelf area where the shelf 1 is located, and move the shelf 1 to the shelf temporary placement area 702 according to the route indicated by the transportation passage shown in order of "H1→H2", the shelves such as the shelf 1, the shelf 2, . . . , the shelf 10, etc., are sequentially moved to the shelf temporary placement area 702 by repeating the above-mentioned moving operation. Among them, the moving passage used in the process of moving the shelves such as the shelf 1, the shelf 2, . . . , the shelf 10, etc. may be determined based on the actual placement of the shelves such as the shelf 1, the shelf 2, . . . , the shelf 10, etc. and a placement position that the shelves such as the shelf 1, the shelf 2, . . . , the shelf 10, etc. will be placed in the shelf temporary placement area 702, respectively. When the shelves such as the shelf 1, the shelf 2, . . . , the shelf 10, etc. are moved to the shelf temporary placement area 702, it may be ensured that the shelf 11 is not blocked by the shelves such as the shelf 1, the shelf 2, . . . , the shelf 10, etc. and the first preset passage is not blocked.

In step 803, the second self-driven robot is instructed to move the target shelf from the current position to the workstation according to the first preset passage, such that the user may pick up the target article on the target shelf.

In an embodiment of the present application, the step in which the second self-driven robot is instructed to move the target shelf from the current position to the workstation according to the first preset passage may include step 8031a and step 8031b (not shown in FIG. 8).

In step 8031a, upon detecting that the blocking shelf is moved, the second self-driven robot is instructed to travel to the shelf area where the target shelf is located, and move the target shelf out of the shelf area where the target shelf is located.

In step 8031b, the second self-driven robot is instructed to move the removed target shelf from the current position to the workstation according to the first preset passage, where the target article is stored on the target shelf.

In this embodiment, referring to FIGS. 7a and 7b, taking the target shelf as the shelf 11 and the blocking shelf as the shelf 1, the shelf 2, . . . , the shelf 10, etc., as an example, upon detecting that the shelf 11 is operated such that the shelf 1, the shelf 2, . . . , the shelf 10, etc., is moved to the shelf temporary placement area 702 by the first self-driven robot 704 according to the second preset passage in sequence, and the second self-driven robot 704 may be instructed to travel to the position where the shelf 11 is located and move the shelf 11 from the shelf area where the shelf 11 is located. After the shelf 11 is removed from the shelf area where the shelf 11 is located, the second self-driven robot 704 may continue to be instructed to move the shelf 11 to the workstation 703 according to the direction of the route indicated by the transport passage "H1", so that the user may pick up the target article from the target shelf.

It should be noted that, for the shelf of this embodiment, a shelf of only one box may be placed on each level of the shelf, and only one opening is provided on one side of the shelf, or two storage boxes or even more storage boxes may be placed on each level of the shelf, and two sides of each shelf are each provided with one opening. It is assumed that there is an open shelf on each side of the shelf, when the target shelf arrives at the workstation, it only needs to rotate the target shelf to get the box on the corresponding side.

In an embodiment of the present application, the step in which the second self-driven robot is instructed to move the target shelf from the current position to the workstation according to the first preset passage, may include step 8032a and step 8032b (not shown in FIG. 8).

In step 8032a, upon detecting that the blocking shelf is moved, the second self-driven robot is instructed to travel to the shelf area where the target shelf is located, and remove the target storage box from the target shelf.

In step 8032b, the second self-driven robot is instructed to move the removed target storage box from the current position to the workstation according to the first preset passage, where the target storage box is placed on the target shelf, and the target article is stored in the target storage box.

In this embodiment, referring to FIGS. 7a and 7b, taking the target shelf as the shelf 11 and the blocking shelf as the shelf 1, the shelf 2, . . . , the shelf 10, etc., as an example, upon detecting that the shelf 11 is operated such that the shelf 1, the shelf 2, . . . , the shelf 10, etc., is moved to the shelf temporary placement area 702 by the first self-driven robot 704 according to the second preset passage in sequence, and the second self-driven robot 704 may be instructed to travel to the position where the shelf 11 is located and remove the target storage box from the shelf 11. Then the second self-driven robot 704 is instructed to move the target storage box removed from the shelf 11 to the workstation 703 according to the direction of the route indicated by the transport passage "H1", so that the user may pick up the target article from the target storage box. It should be noted that, for the shelf of this embodiment, two storage boxes or even more storage boxes may be placed on each level of each shelf, and two sides of each shelf are respectively provided with one opening.

In the embodiment of the present application, when the shelves such as the shelf 1, the shelf 2, . . . , the shelf 10, etc. are moved, one first self-driven robot 704 may be used, or multiple first self-driven robots 704 may be used. For example, in order to speed up the movement of shelves 1 to 10, 10 first self-driven robots 704 may be chose to move the shelves, such as the shelf 1, the shelf 2, . . . , and the shelf 10 at the same time, it may be quickly out back to the original position when the shelves such as the shelf 1, the shelf 2 . . . , the shelf 10, etc., needs to be place back. It should be noted that the technical solution of this embodiment mainly adopts the Huarong principle (a type of Klotski, a traditional puzzle involving sliding wooden blocks, loosely based on an episode in Three Kingdoms).

It should be noted that, for other processes when the layout of the mini-warehouse illustrated in FIG. 7A is implemented, refer to the process of implementing the layout of the mini-warehouse illustrated in FIG. 3, which will not be described here.

In addition to carry the shelf to the workstation, the self-driven robot may also pick up the storage boxes on the shelves and carry the storage boxes to the workstations, such that the staff at the workstation or the owner of the articles may remove the articles from the storage box. Here, the self-driven robot may take the storage box off the shelf by means of various manipulators or robotic arm structures. For example, the first to the $N_{th}$ (N is a natural number greater than or equal to 1) self-driven robots may carry the blocking shelf located on the carrying passage of the target shelf one by one to the shelf temporary placement area, and then the $N+1_{th}$ self-driven robot may remove the target storage box from the target shelf and carry to the workstation for an appropriate processing operation, the target storage box is placed back to the target shelf after being processed.

In the method for moving the article based on the dense storage provided in the embodiment of the present application, the method includes: upon detecting that that the target shelf is blocked by the blocking shelf and the first preset passage is blocked, the first self-driven robot is instructed to move the blocking shelf according to the second preset passage, so that the target article on the target shelf is not blocked by the blocking shelf, where the first preset passage is a moving passage from the current position of the target shelf to the workstation; the second self-driven robot moves the target shelf from the current position to the workstation according to the first preset passage, such that the user may pick up the target article on the target shelf. The technical solution of the embodiment of the present application avoids a situation in which a self-driven robot is unable to freely move to the shelf position so as to move an article required by a user as in a traditional large warehouse, such that the stored article may also be freely moved in dense storage scenario.

Figure 9:
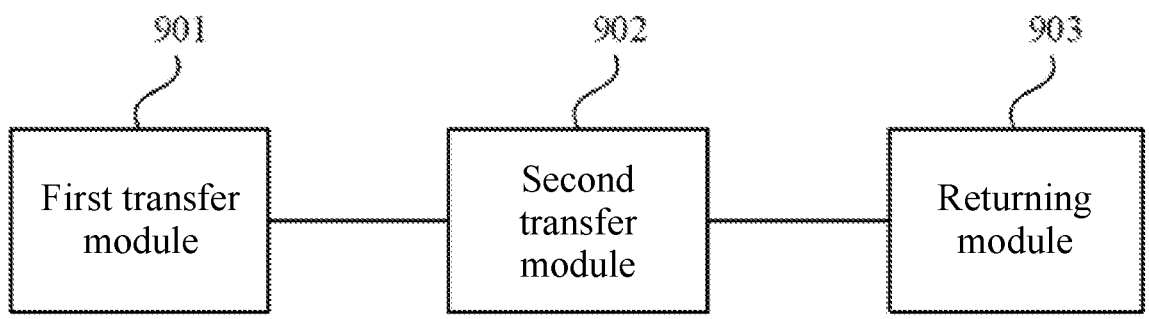
FIG. 9 is a schematic diagram illustrating an article moving device based on dense storage in accordance with an embodiment of the present application.

FIG. 9 is a schematic diagram illustrating an article moving device based on dense storage in accordance with an embodiment of the present application. The embodiment of the present application may be applied to a case that a robot moves articles in the shelf when the shelf is densely placed. The device may be implemented by using software and/or hardware. The device may be integrated into any computer apparatus having a network communication function, and the computer apparatus may be a server configured to control the movement of articles in densely placed shelves, or may be a computer apparatus such as a computer, etc.

As illustrated in FIG. 9, the article moving device based on the dense storage in the embodiment of the present application may include a first transfer module 901 and a second transfer module 902.

The first transfer module 901 is configured to instruct a first self-driven robot to move a blocking shelf according to a second preset passage when a target shelf is detected to be blocked by the blocking shelf, so that a target article on the target shelf is not blocked by the blocking shelf, where the first preset passage is a moving passage from a current position of the target shelf to a workstation The second transfer module 902 is configured to instruct a second self-driven robot to move the target shelf from the current position to the workstation according to the first preset passage, so that the user may pick up the target article on the target shelf.

In an embodiment of the present application, the first transfer module 901 may include a block shelf first removing unit and a block shelf first moving unit, where the block shelf first removing unit is configured to instruct the first self-driven robot to travel to a shelf area where the blocking shelf located outside the target shelf and blocking the target shelf is located, and remove the blocking shelf from a shelf area where the blocking shelf is located, and the block shelf first moving unit is configured to instruct the first self-driven robot to cause the removed the blocking shelf to perform a circular movement on a robot travelling passage according to the second preset passage.

In an embodiment of the present application, the second transfer module 902 may include a target shelf first removing unit and a target shelf first moving unit, where the target shelf first removing unit is configured to instruct a second self-driven robot to travel to a shelf area where the target shelf is located and remove the target shelf from the shelf area where the target shelf is located, and the target shelf first moving unit is configured to instruct the second self-driven robot to move the removed target shelf from the current location to the workstation, where the target article is stored on the target shelf.

In an embodiment of the present application, the second transfer module 902 may include a target storage box first removing unit and a target storage box first moving unit, where the target storage box first removing unit is configured to instruct the second self-driven robot to travel to a shelf area where the target shelf is located and remove the target storage box from the target shelf, where the target storage box is placed on the target shelf, and the target storage box first moving unit is configured to instruct the second self-driven robot to move the removed target storage box from the current position to the workstation according to the first preset passage, where the target article is stored in the target storage box.

In an embodiment of the present application, the first transfer module 901 may include a blocking storage box removing unit and a blocking storage box moving unit, where the blocking storage box removing unit is configured to instruct the first self-driven robot to travel to a shelf area where the blocking shelf located outside the target shelf and blocking the target shelf is located, and remove the blocking storage box from the blocking shelf and/or the target shelf, where both two sides of the blocking shelf and two sides of the target shelf are provided with two openings, and the blocking storage box is placed on the blocking shelf, and the blocking storage box and/or the target storage box are placed on the target shelf, and the blocking storage box moving unit is configured to instruct a first self-driven robot to cause the multiple removed blocking storage boxes to perform a circular movement on the robot travelling passage according to the second preset passage.

In yet another embodiment of the present application, the second transfer module 902 may include a target storage box second removing unit and a target storage box second moving unit, where the target storage box second removing unit is configured to instruct the second self-driven robot to travel to a shelf area where the blocking shelf is located when it is detected that the blocking storage box on the blocking shelf and/or the target shelf is moved, and remove the target storage box form the target shelf via two openings on two sides of the blocking shelf, and the target storage box second moving unit is configured to instruct the second self-driven robot to move the removed target storage box form the current position to the workstation according to the first preset passage, where the target article is stored in the target storage box, and the target storage box is placed on the target shelf.

In another embodiment of the present application, the first transfer module 901 may include a target shelf second moving unit and a target shelf second removing unit, where the target shelf second moving unit is configured to instruct the first self-driven robot to travel to a shelf area where the blocking shelf located outside the target shelf and blocking the target shelf is located, and remove the blocking storage box from the shelf area where the blocking shelf is located, the target shelf second moving unit is configured to instruct the first self-driven robot to move the blocking shelf to the shelf temporary placement area according to the second preset passage.

In another embodiment of the present application, the second transfer module 902 may include a blocking shelf second removing unit and a blocking shelf second moving unit, where the blocking shelf second removing unit is configured to instruct the second self-driven robot to travel to a shelf area where the target shelf is located, and remove the target shelf from the shelf area where the target shelf is located, and the blocking shelf second moving unit is configured to instruct the second self-driven robot to move the removed target shelf form the current position to the workstation according to the first preset passage, where the target article is stored on the target shelf.

In an embodiment of the present application, the device further includes a returning module 903, the returning module 903 is configured to instruct the second self-driven robot to place the target shelf or the target storage box on the target shelf back to the original position after it is detected that the user has picked up the target article at the workstation, and instruct the first self-driven robot to place the blocking shelf and/or the blocking storage box back to the original position again.

The article moving device based on the dense storage provided by the embodiment of the present application may execute the method for moving the article based on the dense storage in accordance with any of the embodiments of the present application, and may have corresponding function modules for executing the method for moving the article based on the dense storage.

Figure 10:
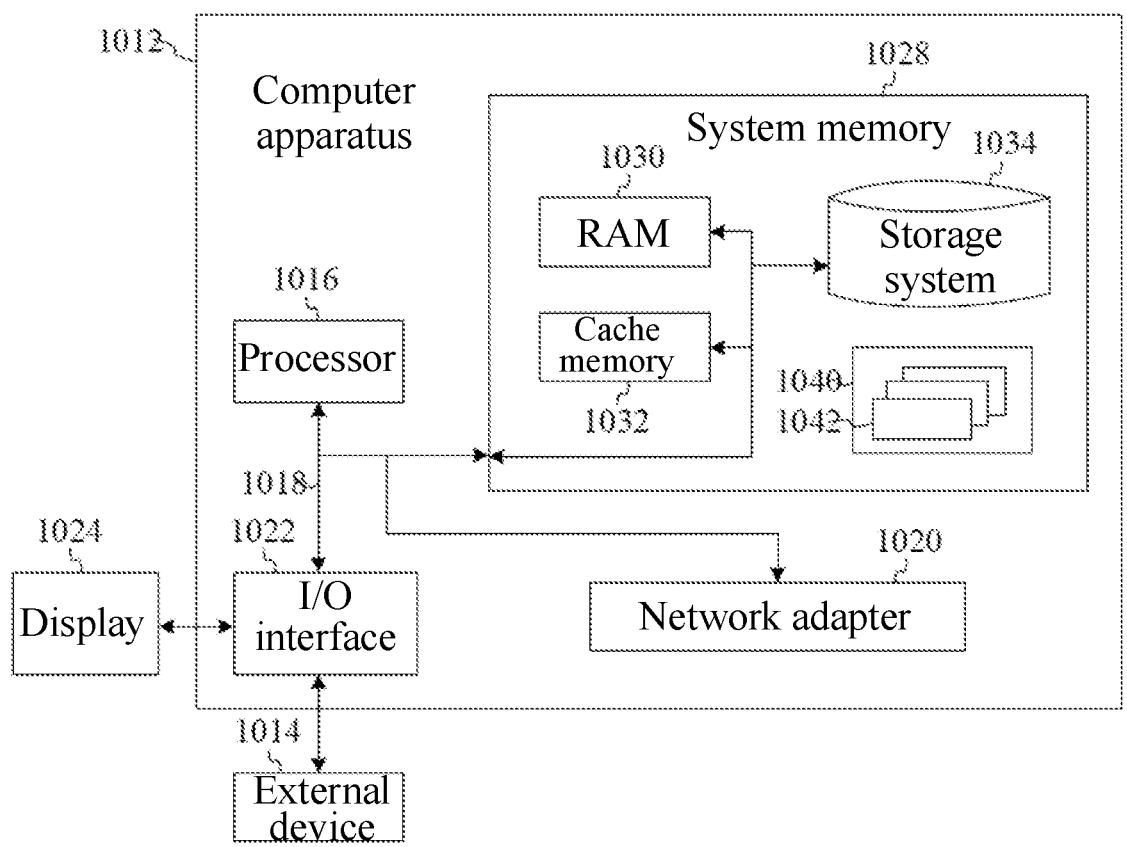
FIG. 10 is a schematic diagram illustrating a computer apparatus in accordance with an embodiment of the present application.

An embodiment of the present application provides a computer apparatus. The computer apparatus includes at least one processor and a storage device. The storage device is configured to store at least one program, and the at least one program, when executed by the at least one processor, implements the method for moving the article based on the dense storage in the above-mentioned embodiment. FIG. 10 is a schematic diagram illustrating a computer apparatus in accordance with an embodiment of the present application. FIG. 10 shows a block diagram of an exemplary computer apparatus 1012 suitable for use in implementing embodiments of the present application. The computer apparatus 1012 illustrated in FIG. 10 is merely an example, which will not impose any limitation on the functions and scope of use of the embodiments of the present application.

As illustrated in FIG. 10, the computer apparatus 1012 is represented in the form of a general-purpose computing apparatus. The computer apparatus 1012 may include, but are not limited to, one or more processors or processing units 1016, a system memory 1028, and a bus 1018 connecting different system assemblies (including the system memory 1028 and the processing unit 1016).

The bus 1018 represents one or more of several types of bus structures, including a memory bus or a memory controller, a peripheral bus, a graphics acceleration port, a processor, or a local area bus using any of a variety of bus structures. For example, these architectures include, but are not limited to, an industry standard architecture (ISA) bus, a micro passage architecture (MAC) bus, an enhanced ISA bus, a video electronics standards association (VESA) local bus and a peripheral component interconnect (PCI) bus.

The computer apparatus 1012 typically includes a variety of computer system-readable media. These media may be any available media that may be accessed by the computer apparatus 1012, including volatile and non-volatile media, removable and non-removable media.

The system memory 1028 may include a computer system readable medium in the form of a volatile memory, such as a random access memory (RAM) 1030 and/or a cache memory 1032. The order supply and demand scheduling computer apparatus 1012 may include other removable/non-removable, volatile/nonvolatile computer system storage media. By way of example only, the storage system 1034 may be configured to read and write non-removable, non-volatile magnetic media (not shown in FIG. 10, commonly referred to as "a hard drive"). Although not shown in FIG. 10, a magnetic disk drive for reading and writing to a removable non-volatile magnetic disk (such as "a floppy disk") and an optical disk drive for reading and writing to a removable non-volatile magnetic disk such as a compact disc read-only (CD-ROM), a digital video disc-read only memory (DVD-ROM) or other optical media may be provided. In these cases, each drive may be connected to the bus 1018 through one or more data medium interfaces. The memory 1028 may include at least one program product having a set (for example, at least one) of program modules configured to perform the functions of the embodiments of the present application.

A program/utility tool 1040 having a set (at least one) of program modules 1042 may be stored in the memory 1028, for example. Such program modules 1042 include, but are not limited to, an operating system, one or more application programs, other program modules, and program data. Each or some combination of these examples may include an implementation of a network environment. The program module 1042 generally performs functions and/or methods in the embodiments described in this application.

The computer apparatus 1012 may also communicate with one or more external apparatus 1014 (for example, a keyboard, a pointing apparatus, a display 1024, etc.), may also communicate with one or more apparatus that enable a user to interact with the computer apparatus 1012, and/or with any apparatus that enables the computer apparatus 1012 to be communicated with one or more other computing apparatuses (such as a network card, a modem, etc.). This communication may be performed through an input/output (I/O) interface 1022. Moreover, the computer apparatus 1012 may also communicate with one or more networks (for example a local area network (LAN), a wide area network (WAN), and/or a public network, such as an Internet) through a network adapter 1020. As shown, the network adapter 1020 communicates with other modules of the computer apparatus 1012 through the bus 1018. It should be understood that although not shown in FIG. 10, other hardware and/or software modules may be used in conjunction with the computer apparatus 1012, including but not limited to a microcode, an apparatus drive, a redundant processing unit, an external disk drive array, a redundant arrays of independent disk (RAID) system, a tape drive, and a data backup storage system, etc.

The processing unit 1016 executes various functional applications and data processing by running programs stored in the system memory 1028. For example, the method for moving an article based on dense storage provided by the embodiment of the present application includes: upon detecting that the first preset passage to the target shelf is blocked, the first self-driven robot is instructed to move the blocking shelf according to the second preset passage such that the target article on the target shelf are not blocked by the blocking shelf, where the first preset passage is a moving passage from the current position of the target shelf to a workstation; instructing a second self-driven robot to move the target shelf from the current position to the workstation according to the first preset passage, so that the user may pick up the target article on the target shelf.

An embodiment of the present application further provides a computer-readable storage medium on which a computer program is stored. When the program is executed by a processor, the method for moving an article based on dense storage as provided in the embodiment of the present application is implemented. The method includes: upon that the first preset passage to the target shelf is blocked by the blocking shelf, instructing the first self-driven robot to move the blocking shelf in accordance with the second preset passage so that the target article on the target shelf are not blocked by the blocking shelf, where the first preset passage is a moving passage from the current position of the target shelf to the workstation; and the second self-driven robot is instructed to remove the target shelf from the target passage according to the first preset passage. The current position is moved to the workstation so that the user may pick up the target article on the target shelf.

The computer storage medium in the embodiments of the present application may adopt any combination of one or more computer-readable media. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination thereof. More specific examples (non-exhaustive list) of computer-readable storage media include: electrical connections with one or more wires, portable computer disks, hard disks, RAM, ROM, EPROM or flash memory, optical fiber, CD-ROM, optical memory device, a magnetic memory device, or any suitable combination of the foregoing. In this document, a computer-readable storage medium may be any tangible medium that contains or stores a program that may be used by or in combination with an instruction execution system, apparatus, or device.

The computer-readable signal medium may include a data signal propagated in baseband or transmitted as part of a carrier wave, which carries a computer-readable program code. Such a propagated data signal may take many forms, including but not limited to electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device.

The program code contained on the computer-readable medium may be transmitted using any appropriate medium, including but not limited to wireless, wire, optical fiber cable, radio frequency (Radio Frequency, RF), etc., or any suitable combination of the foregoing.

The computer program code for performing the operations of this application may be written in one or more programming languages, or a combination thereof, including programming languages such as Java, Smalltalk, C++, and also conventional Procedural programming language—such as "C" or similar programming language. The program code may be executed entirely on the user's computer, partly on the user's computer, as an independent software package, partly on the user's computer, partly on a remote computer, or entirely on a remote computer or server. In the case of a remote computer, the remote computer may be connected to the user's computer through any kind of network, including a LAN or wide area network WAN, or it may be connected to an external computer (such as using an Internet service provider to connect over the Internet).

Figure 11:
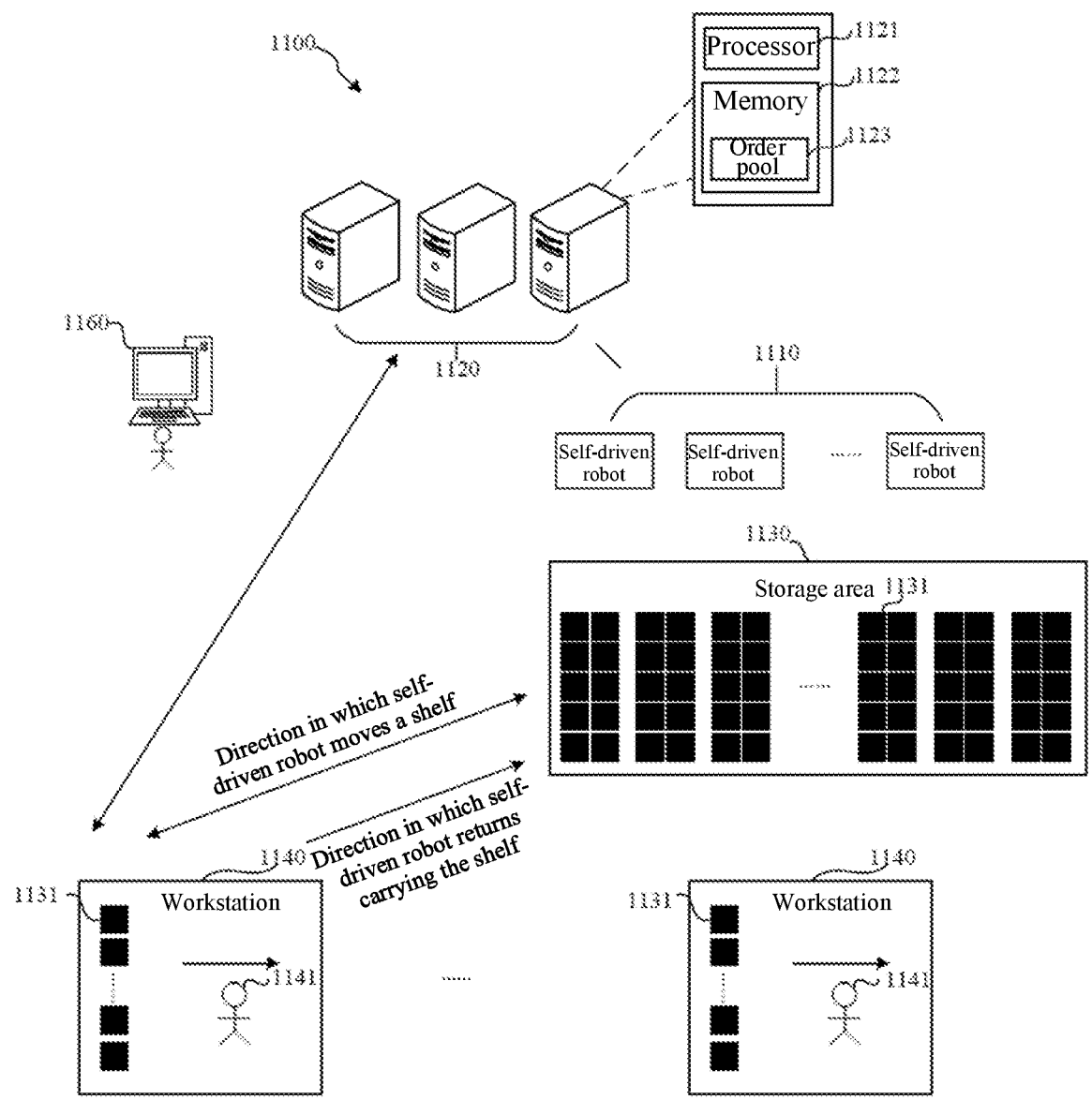
FIG. 11 is a schematic diagram illustrating a system structure of an unmanned self-service operating system in accordance with an embodiment of the present application.
Figure 12:
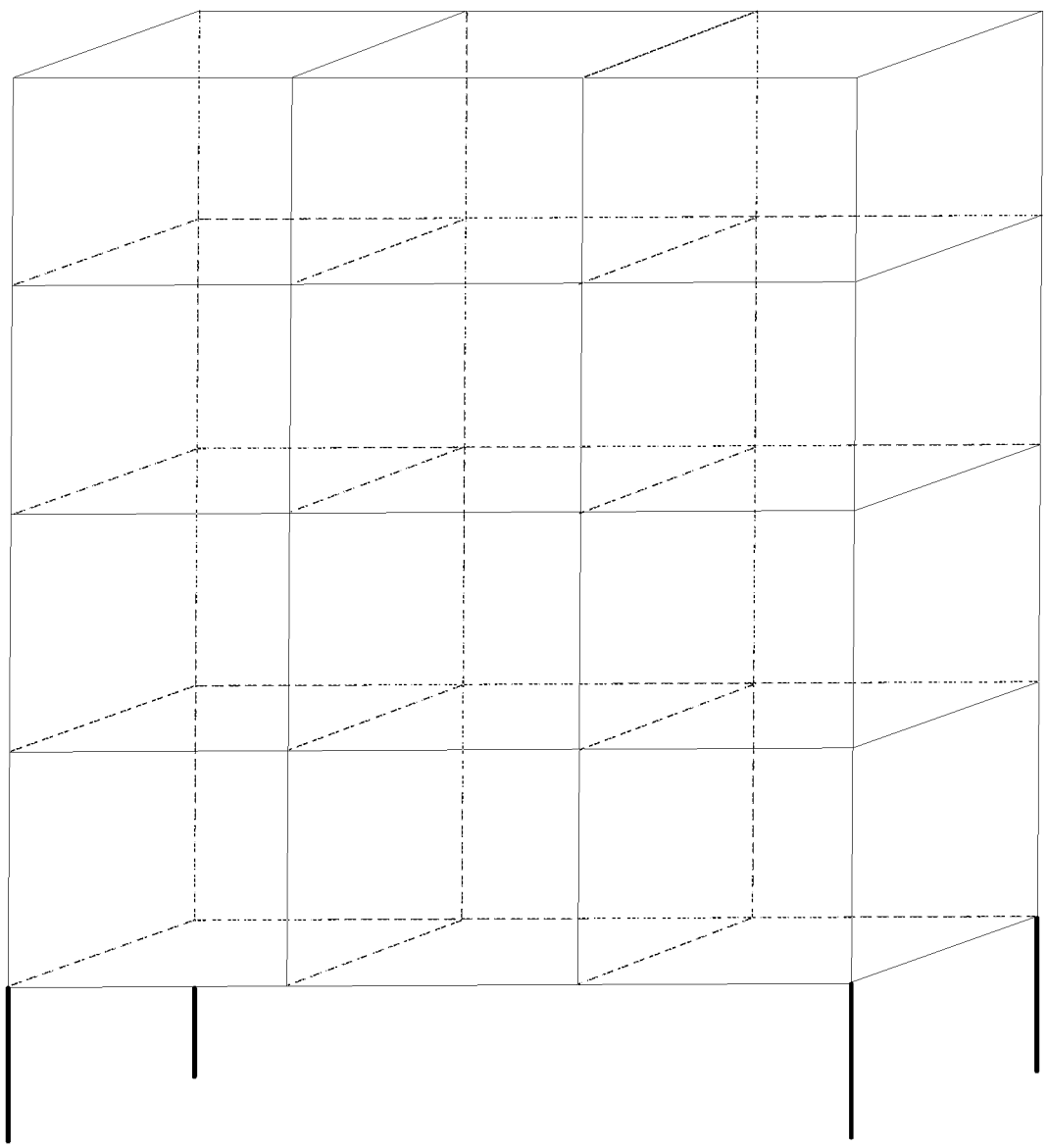
FIG. 12 is a schematic diagram illustrating a single-opening shelf in accordance with an embodiment of the present application.

FIG. 11 is a schematic diagram illustrating the system structure of an unmanned self-service operating system provided in an embodiment of the present application. Referring to FIG. 11, the system 1100 includes a self-driven robot 1110, a control system 1120, a storage area 1130, and a workstation 1140. The storage area 1130 is provided with a plurality of storage containers 1131, and various articles are placed on the storage container 1131, 1131 are arranged in an array, such as the shelves on which various commodities are placed in supermarkets. Generally, a plurality of workstations 1140 are provided on one or more sides of the storage area 1130 (the side shown in the FIG. 11). The storage container 1131 is a container having a slot and capable of storing articles through the slot, such as a shelf, where the shelf includes multiple compartments and four level support columns, and at least one slot is provided on the partition of the shelf. One or more articles may be placed. In addition, the shelf may be a single-opening. For example, FIG. 12 is a schematic structural diagram of a single-opening shelf provided in the embodiment of the present application. The single-opening shelf illustrated in FIG. 12 may also be a double-opening. The rotation of the shelf may operate the articles in either side of the double-opening shelf.

The control system 1120 communicates wirelessly with the self-driven robot 1110. A worker (or user) generates an order through the operating table 1160, and the order is transmitted to the control system 1120. The control system 1120 responds to the order and starts working. The self-driven robot 1110 is in the control system. Under the control of the control system 1120, the self-driven robot may carry out the transportation task. For example, taking the storage container as a shelf, the self-driven robot 1110 may travel along the empty space in the middle of the shelf array (a part of the passage of the self-driven robot 1110), move to the bottom of the shelf, and use a lifting mechanism to lift the shelf and is carried to the assigned workstation 1140.

In one example, the self-driven robot 1110 has a lifting mechanism and an autonomous navigation function. The self-driven robot 1110 may travel to the bottom of the shelf and use the lifting mechanism to lift the entire shelf, such that the shelf may follow the lifting mechanism moves up and down. In one example, the self-driven robot 1110 may travel according to the two-dimensional code information captured by the camera, and may travel under the shelf indicated by the control system 1120 according to the route determined by the control system 1120. The self-driven robot 1110 transfers the shelf to the workstation 1140, and the worker (or user) 1141 removes the articles from the shelf at the workstation 1140. For a double-opening shelf, the self-driven robot 1110 may be used to rotate the shelf such that the opening direction where the article to be picked is located faces the person who picks the article, such as a worker or a user.

The control system 1120 is a software system with data storage and information processing capabilities running on a control server, and may be connected to a self-driven robot, a hardware input system, and other software systems through wireless or wired. The control system 1120 may include one or more control servers, which may be centralized control architecture or a distributed computing architecture. The control server has a processor 1121 and a memory 1122, and the memory 1122 may have an order pool 1123.

The system illustrated in FIG. 11 may be applied to a variety of suitable scenarios. For example, in a picking scenario, after the self-driven robot 1110 moves the storage container 1131 to the workstation 1140, the worker removes the article from the storage container 1131 (the article is Order articles) and put them in a packing box for packing; for example, in the article storage scenario, whether the stored articles are temporarily stored or long-term storage, after the self-driven robot 1110 moves the storage container 1131 to the workstation 1140, the staff or the article owner removes the article from the storage container 1131 or stores the article in the storage container 1131. In particular, in the article storage scenario, in order to ensure privacy and security, a storage container 1131 may specifically place a user's article, or a grid may exclusively place a user's article. Of course, in addition to this, the system is also suitable for unmanned access scenarios and unmanned supermarket scenarios.

Figure 13:
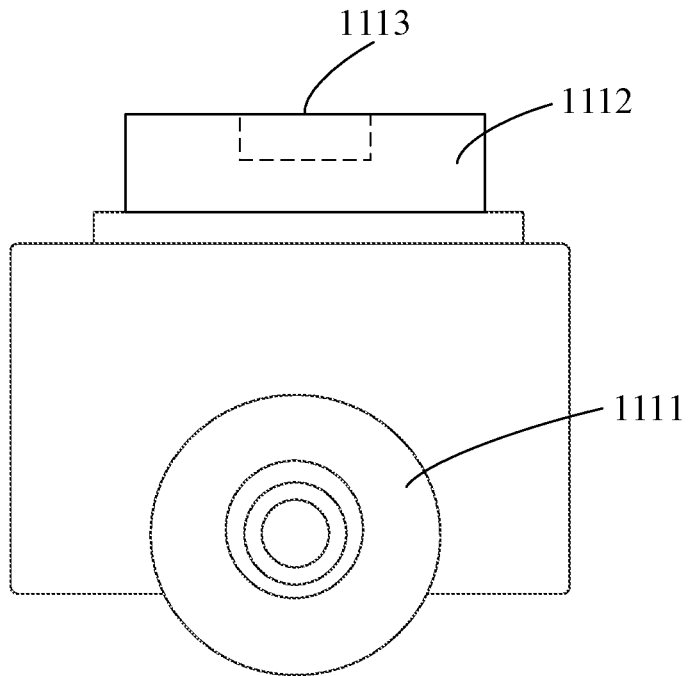
FIG. 13 is a schematic diagram illustrating a self-driven robot in accordance with an embodiment of the present application.

FIG. 13 is a schematic diagram illustrating a self-driven robot provided in an embodiment of the present application. Referring to FIG. 13, the self-driven robot 1110 may include a driving mechanism 1111. By the driving mechanism 1111, the self-driven robot 1110 may move in a working space. The self-driven robot 1110 may further include a lifting mechanism 1112 configured to carry the storage container 1131. The self-driven robot 1110 may move below the storage container 1131, use the lifting mechanism 1112 to lift the storage container 1131, and carry the storage container 1131 to Workstation 1140. When the lifting mechanism 1112 is raised, the entire storage container 1131 is lifted from the ground, such that the self-driven robot 1110 carries the storage container 1131, and when the lifting mechanism 1112 is lowered, the storage container 1131 is placed on the ground. When the self-driven robot 1110 lifts the storage container 1131, the target recognition component 1113 on the self-driven robot 1110 may effectively identify the storage container 1131.

In the related art, in order to enable the robot to smoothly carry the storage container in the storage area, the storage container is generally set to one or two columns as an array unit, and after the passage is set, an array unit is set, and so on. However, under the background that the current use of both the display area and the storage area is expensive, such a setup does not maximize the use of resources. Therefore, this application proposes an article dense storage solution.

The following describes the present application in detail with reference to the drawings and embodiments. It may be understood that the specific embodiments described herein are merely used to explain the present application, rather than limiting the present application. It should also be noted that, for convenience of description, the drawings only show a part of the structure related to the present application, but not the entire structure.

Before discussing the exemplary embodiments in more detail, it should be mentioned that some exemplary embodiments are described as processes or methods depicted as flowcharts. Although the flowchart describes the steps as sequential processing, many of the steps may be performed in parallel, concurrently, or simultaneously. In addition, the order of the steps may be rearranged. Processing may be terminated when its operations are completed, but may also have additional steps not included in the drawings. Processing may correspond to methods, functions, procedures, subroutines, subroutines, and so on.

Figure 14:
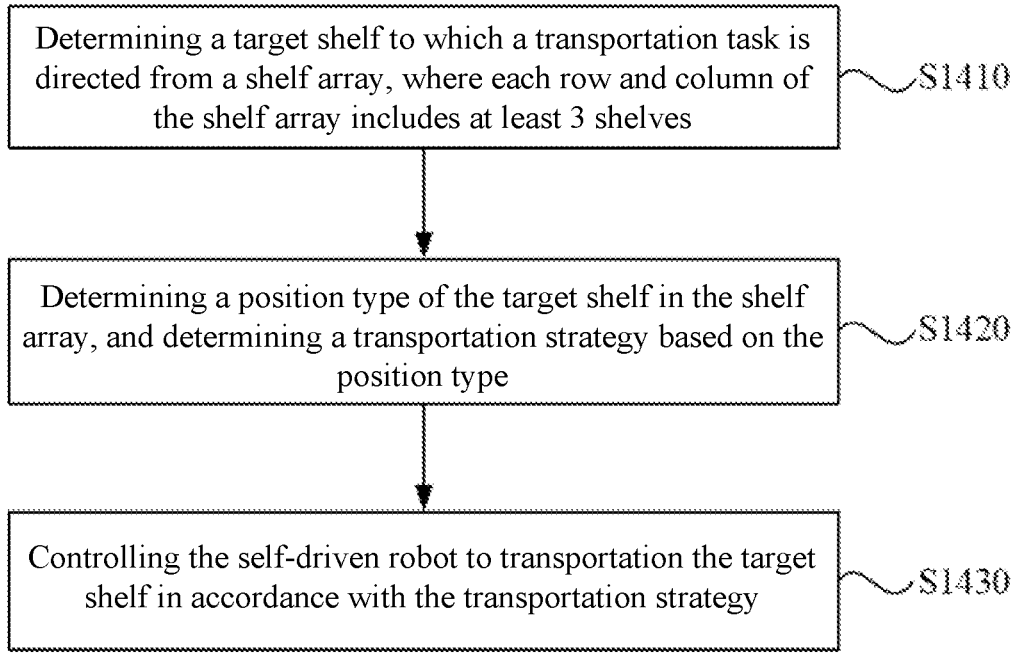
FIG. 14 is a flowchart illustrating an article dense storage method in accordance with an embodiment of the present application.

FIG. 14 is a flowchart illustrating an article dense storage method in accordance with an embodiment of the present application. This embodiment is applicable to the case of cargo storage. This method may be performed by an article dense storage device in accordance with an embodiment of the present application. The device may be implemented by software and and/or hardware, and may be integrated into the article dense storage system.

As illustrated in FIG. 14, the method for densely storing articles includes steps S1410 to S1430.

In step S1410, a target shelf to which a transportation task is directed is determined from a shelf array; a number of shelves in any transverse row and any vertical row of the shelf array is at least 3.

Among them, the transportation task may be determined by the operating table. For example, at the workstation, currently there are some articles that need to be stored on the shelves in the storage area, and the transportation task may be generated through the operating table. Then, in this case, the transportation task may specify two types of shelves, one is an empty shelf, and the other is a shelf that has been placed with article A but is not fully stored. For these two types of shelves, it may be determined by the operation table, and the priority may also be set. It may also be determined according to the number of the articles that need to be stored. It may be understood that for the storage of each article, information may be entered into the control system, which may ensure that the staff may inquire about what articles are stored in each shelf through the console, and may also determine whether the current storage status of each shelf is full. In this way, when there are articles that need to be stored or some articles need to be removed of the storage area, the target shelf of the transportation task may be determined through the control desk.

Figure 15:
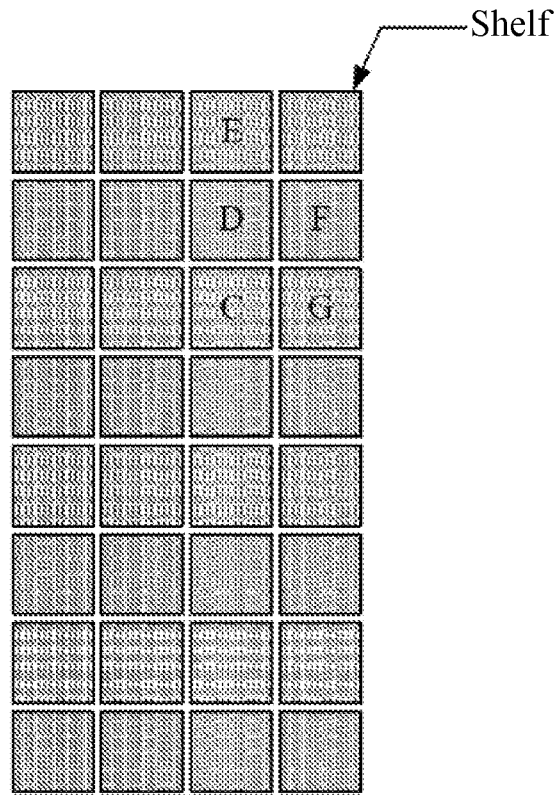
FIG. 15 is a schematic diagram illustrating a dense arrangement of shelves in accordance with an embodiment of the present application.

In this embodiment, the arrangement of the shelves in the shelf array is a dense arrangement, and the number of shelves in any horizontal row and any vertical row of the dense shelf arrangement may be at least three. Among them, there may be a case where the number of shelves in a horizontal row or a vertical row is two, but because the related technology needs to set an passage in the middle of the shelf, when the number of horizontal rows is large, it may be understood here as three or more. The number of vertical shelves may be only two, otherwise the transportation of vertical shelves in the middle will be quite inconvenient. In this application, three, four, or more vertical shelves may be set (when the number of horizontal shelves is large). This is the arrangement of the shelves in the shelf array, which is dense compared to the related technology. FIG. 15 is a schematic diagram illustrating a dense shelf arrangement provided in an embodiment of the present application. Among them, only a kind of 8 rows and 4 columns shelf are shown in FIG. 15, and passages are arranged around the shelves. In one embodiment, it may be designed according to the scope of the storage space and the size of the shelves. After the shelves are densely set, the shelves near the passage need to be removed first for transportation the shelves that are not near the passage. Therefore, the number of shelves in any horizontal row and any vertical row of the dense shelf arrangement is at least three. For example, it may be 4 rows or more rows. The reason for this setting is that when moving a shelf without a passage position, it is only necessary to remove a shelf near the passage position, which is convenient for controlling the transportation efficiency of the shelf. As illustrating in the figure, for example, the shelf D needs to be moved, and the shelf D may be moved by removing the shelf E or the shelf F. For the shelf C, only the shelf G may be moved to move the shelf C. The reason is that if two shelves need to be removed by moving the shelf on the left or upper side of shelf C, it will affect the efficiency of the self-driven robot to move the target shelf. After the arrangement in this way, the distance between the shelves is closer, which reduces the occupation of storage space by the original passage, and which may save space and increase the utilization rate of storage space.

In step S1420, a position type of the target shelf in the shelf array is determined, and a transportation strategy is determined according to the position type.

Wherein, the position types of the target shelf in the dense shelf arrangement may include a first position type and a second position type. The first position type may be a shelf that may be directly handled by a self-driven robot according to the transportation task, and the second position type may be a shelf that may not directly complete the transportation task. Before being moved to the target shelf, the blocking shelf must be moved. Only open. Therefore, the transportation strategy may be determined according to the position type of the target shelf in the dense shelf arrangement. Among them, the transportation strategy may include direct and indirect transportation. Direct transportation refers to directly moving the target shelf to the location specified by the transportation task, while indirect transportation means that the blocking shelf must be removed before the target shelf is moved. Among them, the blocking shelf may be a shelf that needs to be removed first during the process of moving the target shelf. In conjunction with the above example, if the target shelf is D, the blocking shelf may be shelf E, shelf F, and shelf G and shelf C. It may be determined that after the blocking shelf is removed, the self-driven robot may directly move to the location of the target shelf to carry the target shelf.

In step S1430, the self-driven robot is controlled to carry the target shelf based on the transportation strategy.

After the transportation strategy is determined, the self-driven robot is controlled to carry out according to the determined transportation strategy. Among them, the transportation strategy corresponding to the transportation task may be issued to the self-driven robot, and the self-driven robot may complete the transportation task of the target shelf by identifying the current transportation strategy.

The transportation task may include a transportation target address of the target shelf. For example, when the transportation task is carried to a workstation, the transportation path is determined according to the transportation task to achieve the movement of the shelf. The transportation path may be determined according to the position of the shelf in the current warehouse and the positions of the self-driven robot and other equipment.

The technical solution provided in the embodiment of the present application determines the target shelf pointed by the transportation task from the shelf array; the number of shelves in any horizontal row and any vertical row of the shelf array is at least 3; The position type of the target shelf in the shelf array, and a transportation strategy is determined according to the position type; and a self-driven robot is controlled to carry the target shelf based on the transportation strategy. By adopting the technical solution provided in this application, the warehouse space may be fully utilized, and the labor cost of warehouse management may be reduced.

Figure 16:
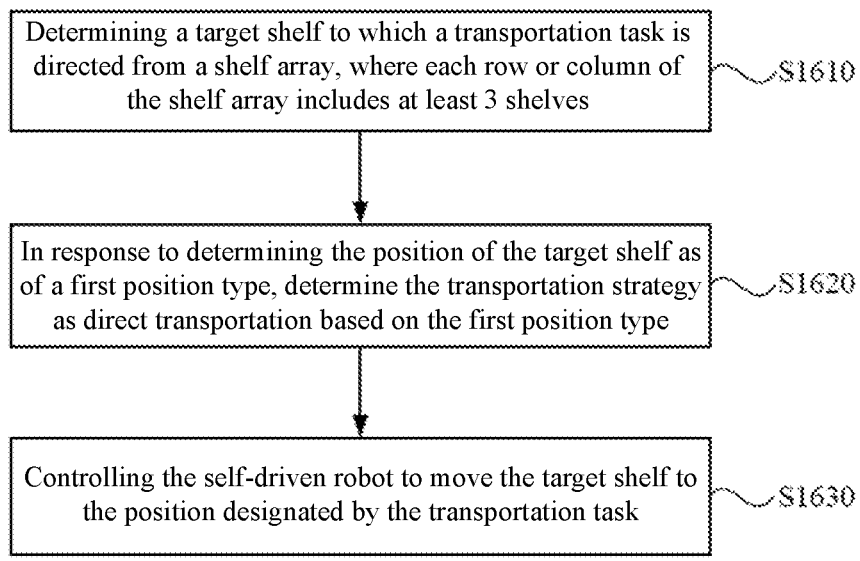
FIG. 16 is a flowchart illustrating an article dense storage method in accordance with an embodiment of the present application.

FIG. 16 is a flowchart illustrating an article dense storage method according to an embodiment of the present application. Based on the above embodiment, this embodiment is detailed as follows: determining the position type of the target shelf in the shelf array, and determining the transportation strategy according to the position type, including: If the position of the target shelf is a first position type, determining a transportation strategy as direct transportation according to the first position type; and controlling the self-driven robot to carry the target shelf based on the transportation strategy includes controlling the self-driven robot to transfer the target shelf to a designated position of the transfer task.

As illustrated in FIG. 16, the article dense storage method proposed in this application includes steps S1610 to S1630.

In step S1610, a target shelf to which a transportation task is directed is determined from a shelf array; a number of shelves in any transverse row and any vertical row of the shelf array is at least 3.

In step S1620, if the position of the target shelf is determined to be of a first position type, the transportation strategy is determined as a direct carrying according to the first position type.

Among them, the position of the target shelf may be determined based on the identification in the control system. It is appreciated that each time the shelf moves in the warehouse, the information needs to be synchronized to the control system, which is beneficial to the control system's implementation of the transportation tasks and the inventory state control. Therefore, after the target shelf is determined, the position type of the target shelf in the dense shelf arrangement may be determined.

It is worth noting that in connection with the above example, as illustrated in FIG. 15, when the target shelf of the transportation task is determined as shelf C, for some reason, shelf D and shelf E are not in the dense shelf queue, the self-driven robot may operate such that the shelf C is dismembered and transported by the positions of the original shelf D and the shelf E. In this case, the position type of the shelf C is the first position type. At the same time, it may be understood that the position type of each shelf in the dense shelf queue may be constantly changing, and it may be the first position type or the second position type.

In addition, in one embodiment, the positions of the shelves may be determined and tracked by obtaining the codes of the shelves, etc. In this way, even if the positions of the shelves in the dense shelf queue have changed, the actual required target shelves may still be determined according to the transportation task. In other words, the position of the shelf in the shelf queue may be synchronized to the control system with an identifier such as the shelf's code.

According to the first position type, the direct transportation strategy is determined. It may be understood that the self-driven robot may move the target shelf without moving the other shelf, but may directly move the target shelf.

In step S1630, the self-driven robot is controlled to carry the target shelf to a designated position of the transportation task.

Among them, the designated position of the transportation task may be a certain workstation or other positions. The designated position of the transportation task may be determined when the transportation task is established, and may be changed in the middle of the self-driven robot transportation. When the position type of the target shelf is the first position type, the self-driven robot is controlled to carry the target shelf to the designated position of the transportation task.

On the basis of the foregoing embodiments, this embodiment provides a shelf transportation method in which the target shelf position is the first position type. Compared with the previous transportation methods, this type of transportation needs to determine whether the position of the target shelf accords with the first position type first, so as to ensure that during the process of delivering the transportation task with the shelf, it will not be impossible because of the position of the target shelf removal, but only the relocation task may not be performed. It ensures the stable operation of the shelf transportation by the self-driven robot.

Figure 17:
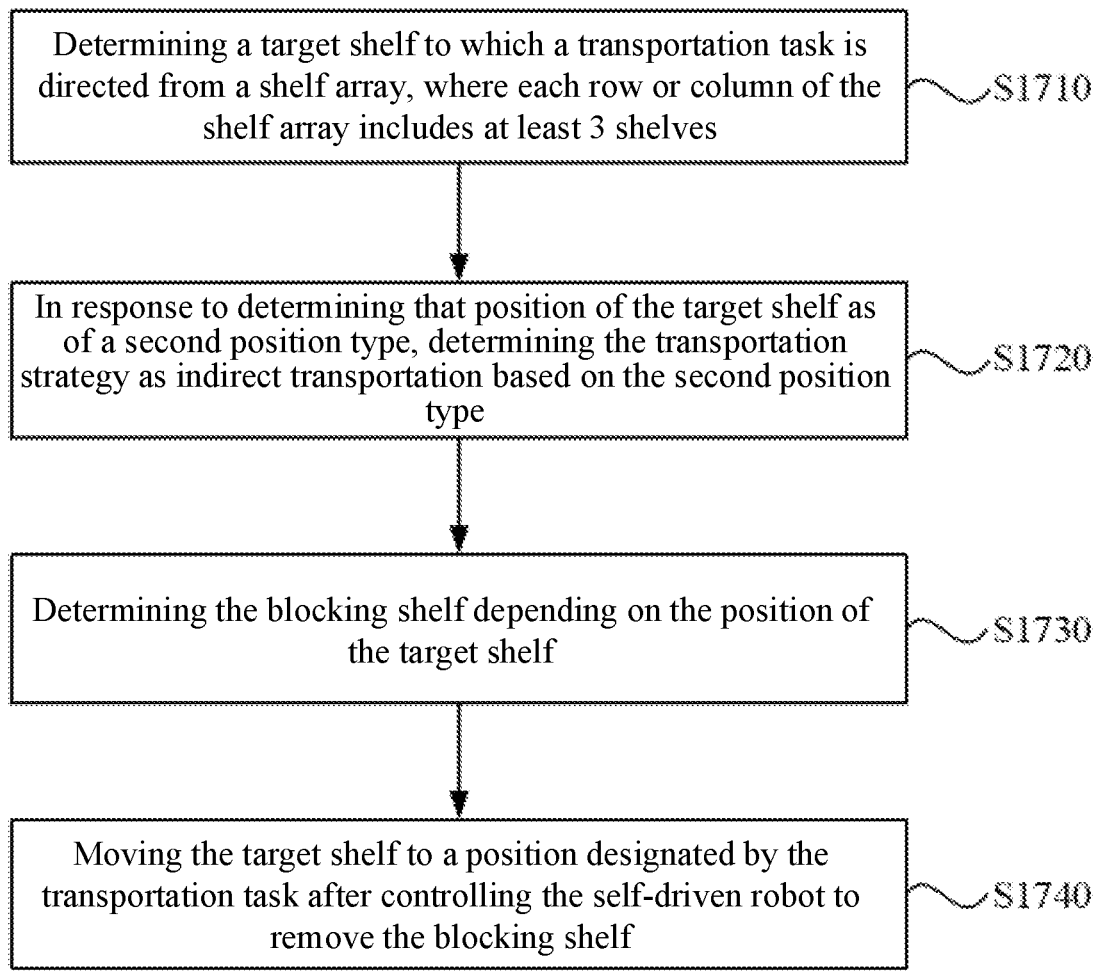
FIG. 17 is a flowchart illustrating an article dense storage method in accordance with an embodiment of the present application.

FIG. 17 is a flowchart illustrating an article dense storage method according to an embodiment of the present application. Based on the above embodiment, this embodiment refines: judging the position type of the target shelf in the dense shelf arrangement, and determining the transportation strategy according to the position type, including: if the position of the target shelf is determined if it is the second position type, determining a transportation strategy as indirect transportation according to the second position type; and controlling the self-driven robot to carry the target shelf based on the transportation strategy includes: according to the position of the target shelf, determining a blocking shelf controlling the self-driven robot to move the target shelf to a designated position of a transportation task after removing the blocking shelf.

As illustrated in FIG. 17, the method for densely storing articles includes steps S1710 to S1740.

In step S1710, a target shelf to which a transportation task is directed is determined from a shelf array; a number of shelves in any transverse row and any vertical row of the shelf array is at least 3.

In step S1720, if the position of the target shelf is determined to be of a second position type, the transportation strategy is determined as a direct carrying according to the second position type.

The second position type may be determined as a position type in which the self-driven robot may not directly carry the target shelf, that is, the target shelf is inside the dense shelf arrangement. Therefore, in this case, the transportation strategy of the target shelf is determined as the indirect transportation strategy.

The indirect transportation strategy is to use the target shelf as the final destination of the transportation task. After the path from the position of the self-driven robot to the least blocking shelf path that the target shelf may pass, remove the blocking shelf and then move the target shelf to the transportation task.

In step S1730, the blocking shelf is determined according to the position of the target shelf.

Among them, the blocking shelf is determined according to the position of the target shelf. When the number of rows or columns with less densely packed shelves is 3 or 4, the maximum number of blocking shelves may be determined. However, the blocking shelf may not be unique. According to the position of the self-driven robot, a blocking shelf is determined. When the number of shelf with fewer rows or columns of dense shelf is greater than 4, the number of blocking shelf may be 2 or more.

In step S1740, after the self-driven robot is controlled to remove the blocking shelf, the target shelf is carried to a designated position of the transport task.

After the blocking shelf is determined, the blocking shelf may be moved away, and the target shelf may be moved to complete the transportation task.

On the basis of the foregoing embodiments, this embodiment provides a method for transporting the target shelf location type to the second location type. This embodiment avoids the situation of dense storage for the shelf. The self-driven robot may stably carry the shelves, and may achieve dense storage of the shelves, saving storage space.

On the basis of the above technical solution, controlling the self-driven robot to move the blocking shelf to the designated position of the transportation task after removing the blocking shelf includes: controlling the self-driven robot to move the blocking shelf to the temporary storage area; controlling the self-driven robot to move the target shelves to the designated location for the transportation task. The temporary storage area may be inside the storage area or outside the storage area. In order to improve the transportation efficiency of the self-driven robot, the temporary storage area may be set inside the storage area, and it is not close to the dense shelf arrangement. The advantage of this technical solution is that a self-driven robot may complete the transportation of the internal shelves, make full use of the resources of the self-driven robot, do not need to set too many self-driven robots, and reduce the input cost of intelligent storage.

On the basis of the above technical solution, controlling the self-driven robot to remove the blocking shelf and then moving the target shelf to the designated position of the transportation task includes: controlling the first self-driven robot to remove the blocking shelf; and controlling the second self-driven robot to move the target shelf to the designated position of the transport task. Among them, after the first self-driven robot removes the blocking shelf, it may always keep the blocking shelf in a carrying state. In this way, the first self-driven robot may dynamically move in the passage position to avoid affecting the work of other self-driven robots. The advantage is that there is no need to set a temporary storage area in the storage area, which reduces the cost of level space. At the same time, when there are multiple self-driven robots in the storage area, the utilization of the self-driven robots may be improved, and the efficiency of the self-driven robots to move to the target shelf may be improved, thereby saving the transportation time.

Based on the above technical solution, if it is determined that the position of the target shelf is the second position type, after controlling the self-driven robot to carry the target shelf based on the transportation strategy, the method further includes: moving the removed blocking shelf back by the self-driven robot to the original position of the blocking shelf or the original position of the target shelf. On the basis of the above technical solutions, this technical solution provides a solution for putting back the blocking shelf, where the original target shelf may be put back, and the original blocking shelf itself may be put back. And the information may be synchronized to the control system. The advantage of returning to the location of the target shelf is that after the target shelf is loaded or unloaded, it may be directly returned to the original blocking shelf position without moving the blocking shelf again. The advantages of returning the blocking shelf to its original location include that it is not necessary to frequently update the position of each shelf, avoiding the frequent updating of the shelf position and causing the wrong statistics of the shelf position of the control system, which improves the operational stability of the intelligent storage.

Figure 18:
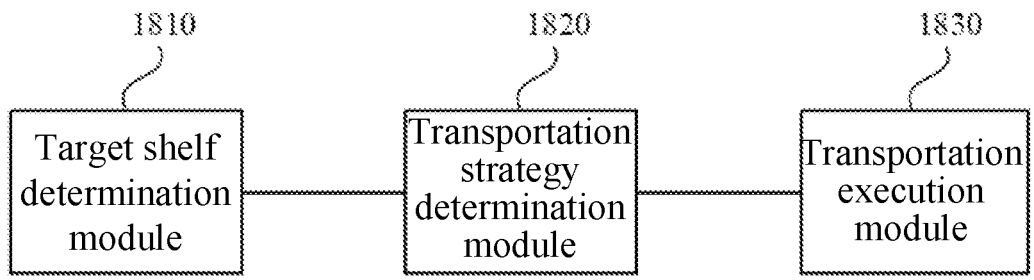
FIG. 18 is a schematic diagram illustrating an article dense storage device in accordance with an embodiment of the present application.

FIG. 18 is a schematic diagram illustrating an article dense storage device according to an embodiment of the present application. As illustrated in FIG. 18, the article dense storage device includes a target shelf determination module 1810, a transportation strategy determination module 1820, and a transportation execution module 1830.

The target shelf determination module 1810 is configured to determine the target shelf pointed by the transportation task from the shelf array; the number of shelves in any horizontal row and any vertical row of the shelf array is at least three.

The transportation strategy determination module 1820 is configured to determine a location type of the target shelf in the shelf array, and determine a transportation strategy according to the location type.

The transportation execution module 1830 is configured to control the self-driven robot to carry the target shelf based on the transportation strategy.

The technical solution provided in the embodiment of the present application determines the target shelf pointed by the transportation task from the shelf array; the number of shelves in any horizontal row and any vertical row of the shelf array is at least 3, where the position type of the target shelf in the shelf array, and a transportation strategy is determined according to the position type; and a self-driven robot is controlled to carry the target shelf based on the transportation strategy. By adopting the technical solution provided in this application, the warehouse space may be fully utilized, and the labor cost of warehouse management may be reduced.

Based on the above embodiments, the transportation strategy determination module 1820 includes a first transportation strategy determining unit, configured to determine that the location of the target shelf is the first location type, and then determine that the transportation strategy is direct transportation according to the first location type.

The transfer execution module 1830 includes a first transfer execution unit configured to control the self-driven robot to transfer the target shelf to a designated position of the transfer task.

Based on the above embodiments, the transportation strategy determination module 1820 includes a second transportation strategy determination unit configured to determine that the location of the target shelf is the second location type, and then determine that the transportation strategy is indirect transportation according to the second location type.

The transportation execution module 1830 includes a blocking shelf determination unit configured to determine the blocking shelf according to the position of the target shelf.

The second transportation execution unit is configured to control the self-driven robot to remove the blocking shelf, and then convey the target shelf to the designated position of the transportation task.

Based on the above embodiments, the second transportation execution unit is configured to control the self-driven robot to move the blocking shelf to the temporary storage area; and control the self-driven robot to convey the target shelf to the designated position of the transportation task.

Based on the above embodiments, the second carrying execution unit is configured to control the first self-driven robot to remove the blocking shelf, and control the second self-driven robot to carry the target shelf to the designated position of the transportation task.

On the basis of the above embodiments, the transportation execution module 1830 further includes: a blocking shelf return unit, configured to control the self-driven robot to move the removed blocking shelf back to the original position of the blocking shelf or the original position of the target shelf.

The above product may execute the method provided in any embodiment of the present application, and has corresponding function modules for executing the method.

Figure 19:
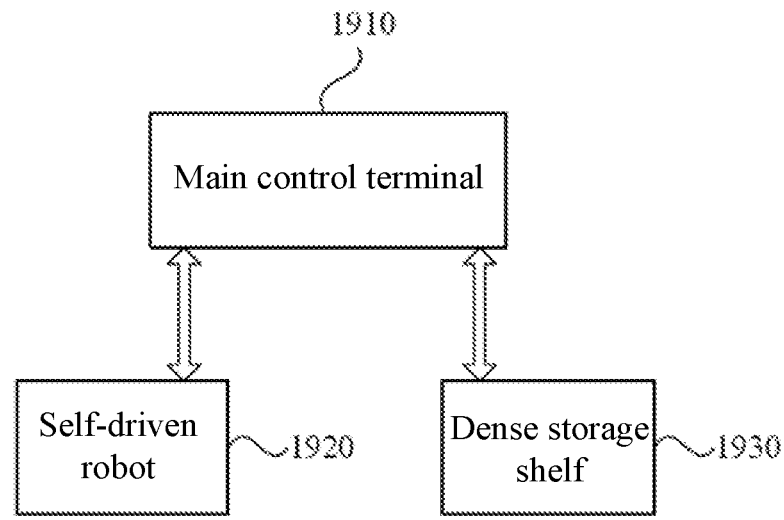
FIG. 19 is a schematic diagram illustrating an article dense storage system in accordance with an embodiment of the present application.

FIG. 19 is a schematic diagram illustrating an article dense storage system provided in an embodiment of the present application. The system includes a main control terminal 1910, at least one self-driven robot 1920, and dense storage shelf 1930. Among them, the number of shelves in any horizontal row and any vertical row of the dense shelf arrangement is at least three.

The main control terminal 1910 includes a memory, a processor, and a computer program stored on the memory and executable by the processor. When the processor executes the computer program, the method for implementing the dense storage of articles provided in any one of the embodiments of the present application is performed.

Figure 20:
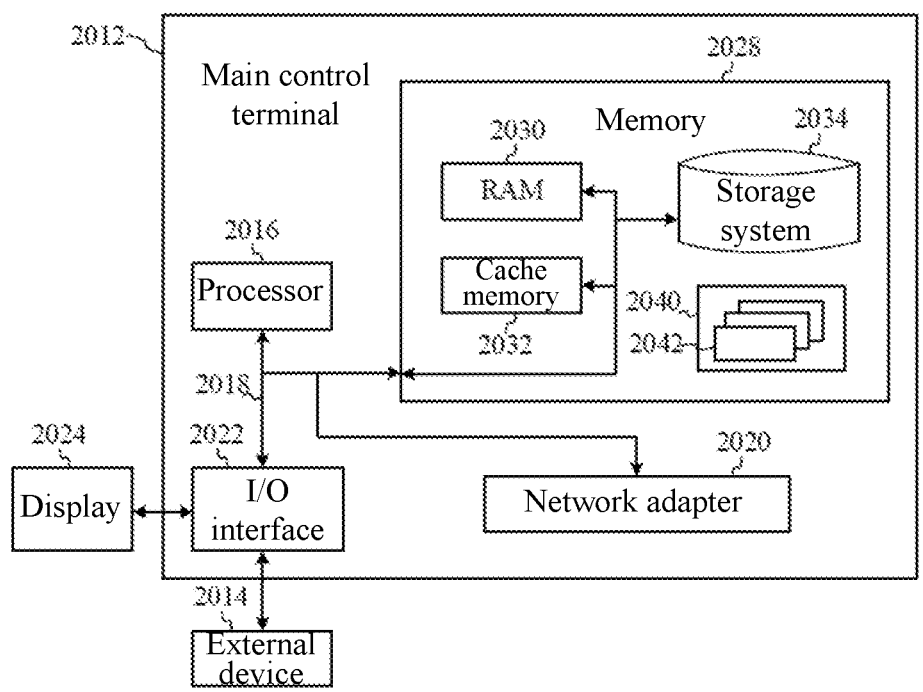
FIG. 20 is a schematic diagram illustrating a main control terminal in accordance with an embodiment of the present application.

FIG. 20 is a schematic diagram illustrating a main control terminal provided in an embodiment of the present application. FIG. 20 illustrates a block diagram of an exemplary main control terminal 2012 suitable for implementing the embodiments of the present application. The main control terminal 2012 illustrated in FIG. 20 is merely an example, and should not bring any limitation on the functions and scope of use of the embodiments of the present application.

As illustrated in FIG. 20, the main control end 2012 is expressed in the form of a general-purpose computing device. The components of the main control end 2012 may include, but are not limited to, one or more processors or processing units 2016, a memory 2028, and a bus 2018 connecting different system components (including the memory 2028 and the processing unit 2016).

The bus 2018 represents one or more of several types of bus structures, including a memory bus or a memory controller, a peripheral bus, a graphics acceleration port, a processor, or a local bus using any of a variety of bus structures. For example, these architectures include, but are not limited to, the ISA bus, MAC bus, enhanced ISA bus, VESA local bus, and PCI bus.

The host 2012 typically includes a variety of computer system readable media. These media may be any available media that may be accessed by the host 2012, including volatile and non-volatile media, removable and non-removable media.

The memory 2028 may include a computer system readable medium in the form of volatile memory, such as RAM) 2030 and/or cache memory 2032. The host 2012 may include other removable/non-removable, volatile/nonvolatile computer system storage media. For example only, the storage system 2034 may be configured to read and write non-removable, non-volatile magnetic media (not shown in FIG. 20, commonly referred to as a "hard drive"). Although not shown in FIG. 20, a disk drive for reading and writing to a removable non-volatile disk (such as a "floppy disk"), and a removable non-volatile optical disk (such as a CD-ROM, DVD-ROM, etc.) may be provided. In these cases, each drive may be connected to the bus 2018 through one or more data medium interfaces. The memory 2028 may include at least one program product having a set (for example, at least one) of program modules configured to perform the functions of the embodiments of the present application.

A program/utility tool 2040 having a set (at least one) of program modules 2042 may be stored in the memory 2028, for example. Such program modules 2042 include, but are not limited to, an operating system, one or more application programs, other program modules, and program data Each of these examples, or some combination, may include an implementation of a network environment. The program module 2042 generally performs functions and/or methods in the embodiments described in this application.

The master 2012 may also communicate with one or more external apparatuses 2014 (such as a keyboard, pointing device, display 2024, etc.), and may also communicate with one or more devices that enable users to interact with the master 2012, and/or communicate with any device (such as a network card, modem, etc.) that enables the master 2012 to communicate with one or more other computing devices. This communication may be performed through the I/O interface 2022. In addition, the master 2012 may also communicate with one or more networks (such as a LAN, WAN, and/or a public network, such as the Internet) through the network adapter 2020. As shown in the FIG., the network adapter 2020 communicates with other modules of the master 2012 through a bus 2018. It should be understood that although not shown in FIG. 20, other hardware and/or software modules may be used in conjunction with the master 2012, including but not limited to a microcode, an apparatus drive, a redundant processing unit, an external disk drive arrays, a RAID system, a tape drive and a data backup storage system.

The processing unit 2016 executes various functional applications and data processing by running programs stored in the memory 2028. For example, the method for implementing the article dense storage method provided in the embodiment of the present application includes: determining, from a shelf array, a target shelf to which a transportation task points. The number of shelves in any horizontal row and any vertical row of the shelf array is at least 3; determining the position type of the target shelf in the shelf array, and determining the transportation according to the position type strategy; controlling the self-driven robot to move the target shelf based on the transportation strategy.

An embodiment of the present application further provides a storage medium containing computer-executable instructions. When the computer-executable instructions are executed by a computer processor, the method is configured to perform an article dense storage method. The method includes: determining a transportation task location from a shelf array. The target shelf that is pointed to; the number of shelves in any horizontal row and any vertical row of the shelf array is at least 3; determining the type of position of the target shelf in the shelf array, and according to the position type determines a transportation strategy, and controls the self-driven robot to carry the target shelf based on the transportation strategy.

The term "storage medium" is intended to include: installation media such as CD-ROMs, floppy disks, or magnetic tape devices; computer system memory or random access memory such as a dynamic random access memory (DRAM), a dual-passage synchronous dynamics double data rate random access memory (DDR RAM), a static random access memory (SRAM), an extended data output random access memory (EDO RAM), a lambas (Rambus) RAM, etc; a non-volatile memory, such as a flash memory, magnetic media (such as a hard disk or optical storage); registers or other similar types of memory elements, etc. The storage medium may further include other types of memory or a combination thereof. In addition, the storage medium may be located in a computer system in which the program is executed, or may be located in a different second computer system connected to the computer system through a network such as the Internet. The second computer system may provide program instructions to a computer for execution. The term "storage medium" may include two or more storage media that may reside in different locations, such as in different computer systems connected through a network. The storage medium may store program instructions (for example, embodied as a computer program) executable by one or more processors.

Certainly, the storage medium containing computer-executable instructions provided in the embodiments of the present application is not limited to the above-mentioned article dense storage operation, and may also be executed in the article dense storage method in accordance with any embodiment of this application.

What is claimed is:

1. A dense storage system, comprising:
a first self-driven robot, configured to remove a blocking shelf and/or a blocking storage box in accordance with an instruction of a control system;
a second self-driven robot, configured to transport a target shelf or a target storage box disposed on the target shelf in accordance with an instruction of the control system;
a shelf area, comprising a plurality of shelves configured for storing articles and being transported by self-driven robots, the plurality of shelves comprising the target shelf which is surrounded by the blocking shelf on its periphery, and the self-driven robots comprising the first self-driven robot and the second self-driven robot; and
the control system, configured to, in response to detecting that the target shelf is blocked by at least one blocking shelf, instruct the first self-driven robot to remove the at least one blocking shelf, so that the target storage box on the target shelf is not blocked by the at least one blocking shelf; instruct the first self-driving robot to carry the at least one blocking shelf and perform a circular movement along a robot travelling passage; and instruct the second self-driven robot to take out the target storage box from the target shelf and carry the target storage box from its current position to a workstation.

2. The dense storage system of claim 1, wherein the first self-driven robot and the second self-driven robot are the same robot.

3. The dense storage system of claim 1, wherein the plurality of shelves in the shelf area are divided into a plurality of shelf groups, each of the plurality of shelf groups is composed of multiple shelves arranged in rows and/or columns, and no passage is arranged between neighboring rows and/or columns of the shelves in each of the plurality of shelf groups for travelling by the self-driven robots, and wherein different shelf groups in the plurality of shelf groups are separated by passages.

4. The dense storage system of claim 1, wherein the target shelf is a double-opening shelf, an opening is provided on each of two sides of the double-opening shelf, and wherein the target storage box is disposed on one side of the target shelf facing away from the blocking shelf, and the blocking storage box is disposed on one side of the target shelf adjacent to the blocking shelf.

5. The dense storage system of claim 4, wherein the control system is further configured to instruct the first self-driven robot to remove the blocking storage box disposed on the target shelf.

6. The dense storage system of claim 1, wherein the blocking shelf is a double-opening shelf.

7. The dense storage system of claim 6, wherein the control system is further configured to, in response to detecting that a target article has been picked up, instruct the second self-driven robot to place the target storage box on the target shelf back to its original position and instruct the first self-driven robot to place the at least one blocking shelf back to its original position.

8. The dense storage system of claim 1, wherein the plurality of shelves in the shelf area are arranged in a plurality of rows and/or columns, and no passage is arranged between the plurality of shelves for travelling by the self-driven robots, and wherein the dense storage system further comprises a shelf temporary placement area, which comprises a plurality of shelf positions.

9. The dense storage system of claim 8, wherein the control system is further configured to instruct the first self-driven robot to carry the at least one blocking shelf to a shelf position in the shelf temporary placement area, and a passage is created by an original position of the removed blocking shelf.

10. A dense storage system, comprising:
a first self-driven robot, configured to remove a blocking shelf and/or a blocking storage box in accordance with an instruction of a control system;
a second self-driven robot, configured to transport a target shelf or a target storage box disposed on the target shelf in accordance with an instruction of the control system;
a shelf area, comprising a plurality of shelves configured for storing articles and being transported by self-driven robots, the plurality of shelves comprising the target shelf which is surrounded by the blocking shelf on its periphery, and the self-driven robots comprising the first self-driven robot and the second self-driven robot; and
the control system, configured to, in response to detecting that the target shelf is blocked by at least one blocking shelf, instruct the first self-driven robot to remove at least one blocking storage box on the at least one blocking shelf, or remove at least one blocking storage box on the at least one blocking shelf and at least one blocking storage box on the target shelf, so that the target storage box on the target shelf is not blocked by the at least one blocking storage box; instruct the first self-driving robot to carry the at least one blocking storage box on the at least one blocking shelf, or carry the at least one blocking storage box on the at least one blocking shelf and at least one blocking storage box on the target shelf, and perform a circular movement along a robot travelling passage; and instruct the second self-driven robot to take out the target storage box from the target shelf and carry the target storage box from its current position to a workstation.

11. The dense storage system of claim 10, wherein the first self-driven robot and the second self-driven robot are the same robot.

12. The dense storage system of claim 10, wherein the plurality of shelves in the shelf area are divided into a plurality of shelf groups, each of the plurality of shelf groups is composed of multiple shelves arranged in rows and/or columns, and no passage is arranged between neighboring rows and/or columns of the shelves in each of the plurality of shelf groups for travelling by the self-driven robots, and wherein different shelf groups in the plurality of shelf groups are separated by passages.

13. The dense storage system of claim 10, wherein the target shelf is a double-opening shelf, an opening is provided on each of two sides of the double-opening shelf, and wherein the target storage box is disposed on one side of the target shelf facing away from the blocking shelf, and the blocking storage box is disposed on one side of the target shelf adjacent to the blocking shelf.

14. The dense storage system of claim 10, wherein the blocking shelf is a double-opening shelf.

15. The dense storage system of claim 14, wherein the control system is further configured to, in response to detecting that a target article has been picked up, instruct the second self-driven robot to place the target storage box on the target shelf back to its original position, and instruct the first self-driven robot to place the at least one blocking storage box on the at least one blocking shelf back to its the original position or place the at least one blocking storage box on the at least one blocking shelf and the at least one blocking storage box on the target shelf back to its original position.

16. A dense storage system, comprising:
a first self-driven robot, configured to remove a blocking shelf and/or a blocking storage box in accordance with an instruction of a control system;
a second self-driven robot, configured to transport a target shelf or a target storage box disposed on the target shelf in accordance with an instruction of the control system;
a shelf area, comprising a plurality of shelves configured for storing articles and being transported by self-driven robots, the plurality of shelves comprising the target shelf which is surrounded by the blocking shelf on its periphery, and the self-driven robots comprising the first self-driven robot and the second self-driven robot; and
the control system, configured to, in response to detecting that the target storage box on the target shelf is blocked by at least one blocking storage box, instruct the first self-driven robot to remove the at least one blocking storage box, so that the target storage box on the target shelf is not blocked by the at least one blocking storage box; instruct the first self-driving robot to carry the at least one blocking storage box and perform a circular movement along a robot travelling passage; and instruct the second self-driven robot to take out the target storage box from the target shelf and carry the target storage box from its current position to a workstation.

17. The dense storage system of claim 16, wherein the first self-driven robot and the second self-driven robot are the same robot.

18. The dense storage system of claim 16, wherein the plurality of shelves in the shelf area are divided into a plurality of shelf groups, each of the plurality of shelf groups is composed of multiple shelves arranged in rows and/or columns, and no passage is arranged between neighboring rows and/or columns of the shelves in each of the plurality of shelf groups for travelling by the self-driven robots, and wherein different shelf groups in the plurality of shelf groups are separated by passages.

19. The dense storage system of claim 16, wherein the target shelf is a double-opening shelf, an opening is provided on each of both sides of the double-opening shelf.

20. The dense storage system of claim 16, wherein the blocking shelf is a double-opening shelf.

21. The dense storage system of claim 20, wherein the control system is further configured to, in response to detecting that a target article has been picked up, instruct the second self-driven robot to place the target storage box on the target shelf back to its original position and instruct the first self-driven robot to place the at least one blocking storage box back to its original position.

\* \* \* \* \*